United States Patent [19]
Rethorst

[11] Patent Number: 5,358,156
[45] Date of Patent: Oct. 25, 1994

[54] SUPERSONIC AIRCRAFT SHOCK WAVE ENERGY RECOVERY SYSTEM

[75] Inventor: Scott Rethorst, South Pasadena, Calif.

[73] Assignee: Vehicle Research Corporation, South Pasadena, Calif.

[21] Appl. No.: 79,503

[22] Filed: Jun. 18, 1993

Related U.S. Application Data

[60] Division of Ser. No. 825,289, Jan. 22, 1992, Pat. No. 5,251,846, which is a continuation-in-part of Ser. No. 557,418, Jul. 23, 1990, abandoned.

[51] Int. Cl.$^5$ .................. B64C 3/10; B64C 21/00; B64C 30/00
[52] U.S. Cl. ..................................... 244/15; 244/204; 244/35 A; 244/45 R
[58] Field of Search ................ 244/13, 15, 45 R, 55, 244/35 R, 35 A, 204, 1 N

[56] References Cited

U.S. PATENT DOCUMENTS

| | | |
|---|---|---|
| 2,644,266 | 8/1953 | Darrieus . |
| 2,836,379 | 5/1958 | Salmon ............................. 244/15 |
| 2,916,230 | 12/1959 | Nial . |
| 2,995,320 | 8/1961 | Gottschalk . |
| 2,997,256 | 8/1961 | Walker . |
| 3,363,861 | 1/1968 | Lambrecht ......................... 244/74 |
| 3,578,264 | 5/1971 | Kuethe . |
| 3,818,700 | 6/1974 | Kantrowitz et al. ............ 244/73 R |
| 3,904,151 | 9/1975 | Rethorst . |
| 4,008,866 | 9/1975 | Rethorst . |
| 4,483,497 | 11/1984 | Rethorst . |
| 4,489,905 | 12/1984 | Bengelink et al. . |
| 4,598,886 | 7/1986 | Friebel et al. . |
| 4,718,620 | 1/1988 | Braden et al. . |
| 4,932,612 | 6/1990 | Blackwelder et al. . |

FOREIGN PATENT DOCUMENTS 945470  5/1949  France .............................. 244/35 A Primary Examiner—Galen L. Barefoot
Attorney, Agent, or Firm—Christie Parker & Hale

[57] ABSTRACT

This invention outlines excitation means to transform the linear momentum of an underwing energized jet into rotational form in a selective manner to provide an asymmetric shear layer to increase compression wave reflection from the forward undersurface of a supersonic wing. The wing compression energy is thereby recovered into useful work as an increase in pressure on the upward reflexed wing backside. The upper surface of the shear layer is comprised of an array of vortices whose rotation is opposite to the wing circulation, providing the required angular momentum reaction. The upper wing surface is flat to avoid generation of waves and an adverse angular momentum reaction above the wing. The vortices below the wing are compressed by the underwing pressure, comprising a pressure shield to enhance the reflection. The shear layer/vortex array grows in the stream direction due to augmented mixing with the underwing gap flow, which is turned and deflected upwards to provide a further increase in pressure on the upwards reflexed wing backside. Fuselage bow shock energy is also recovered into useful work by a forward ring reflecting the conical shock inwards onto a suitably inclined shoulder. An extendable nose spike allows the ring to intercept the conical bow shock at off-design Mach numbers. The system in principle obviates wave drag to provide shock-free supersonic flight with improved efficiency and no sonic boom.

8 Claims, 26 Drawing Sheets

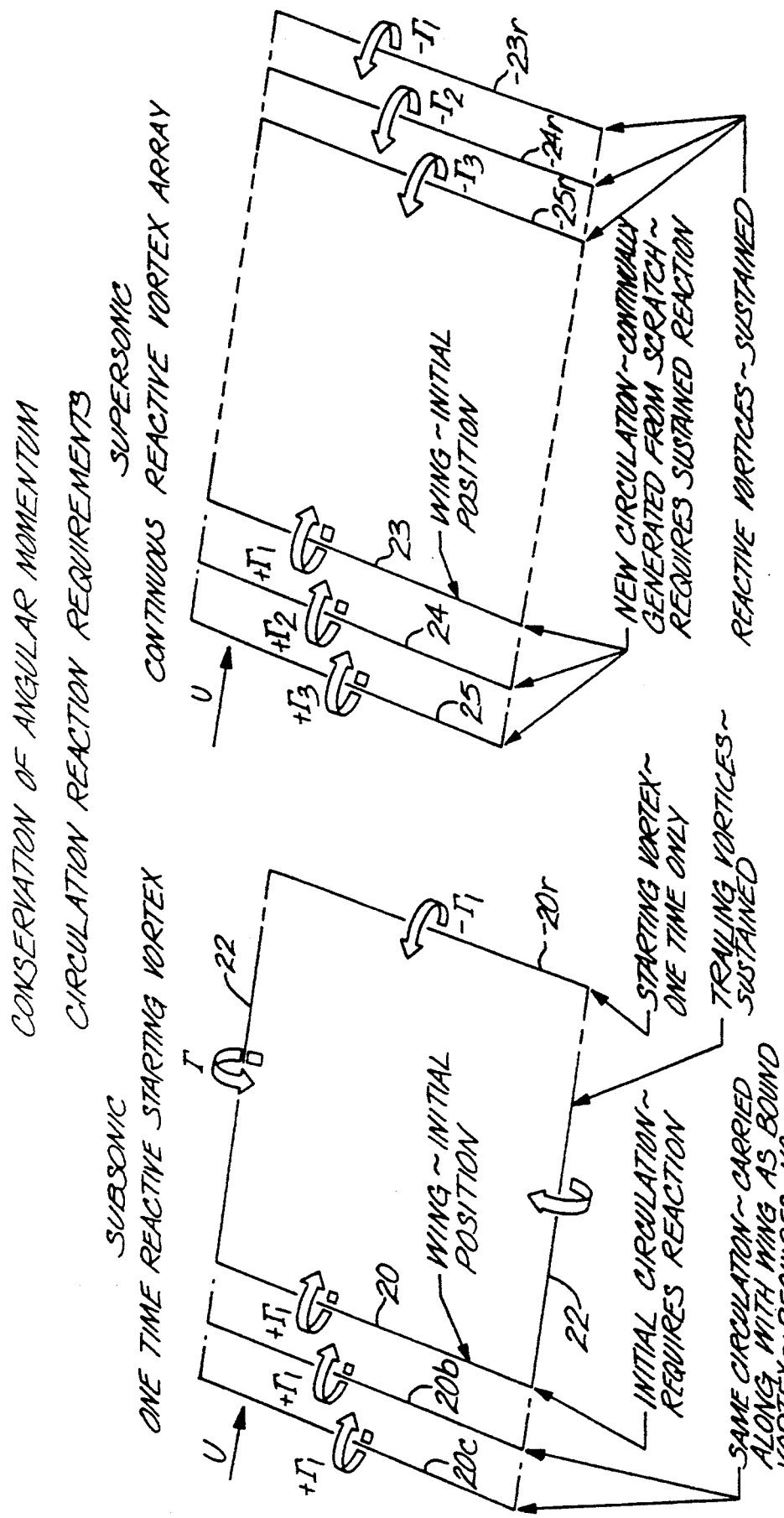

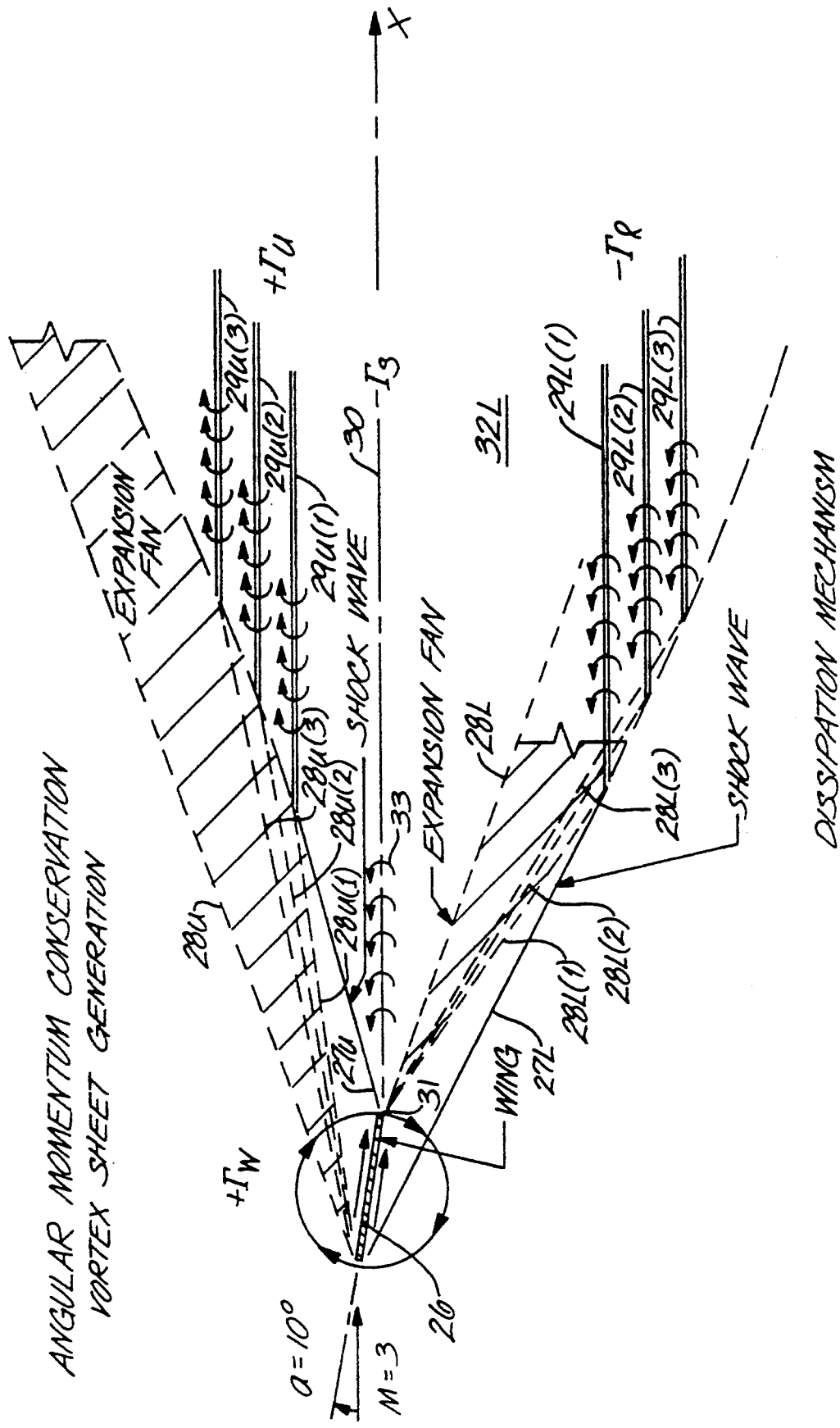

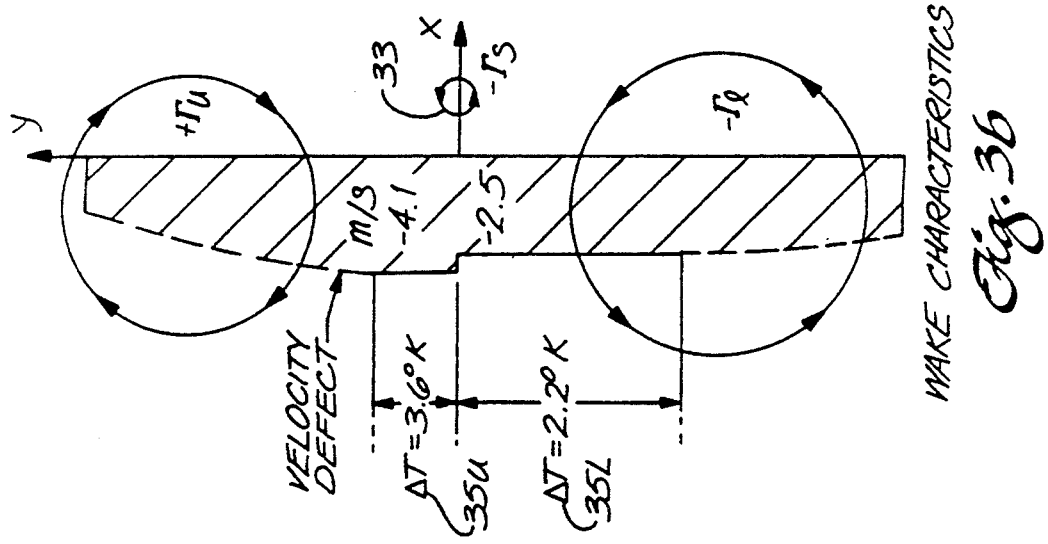
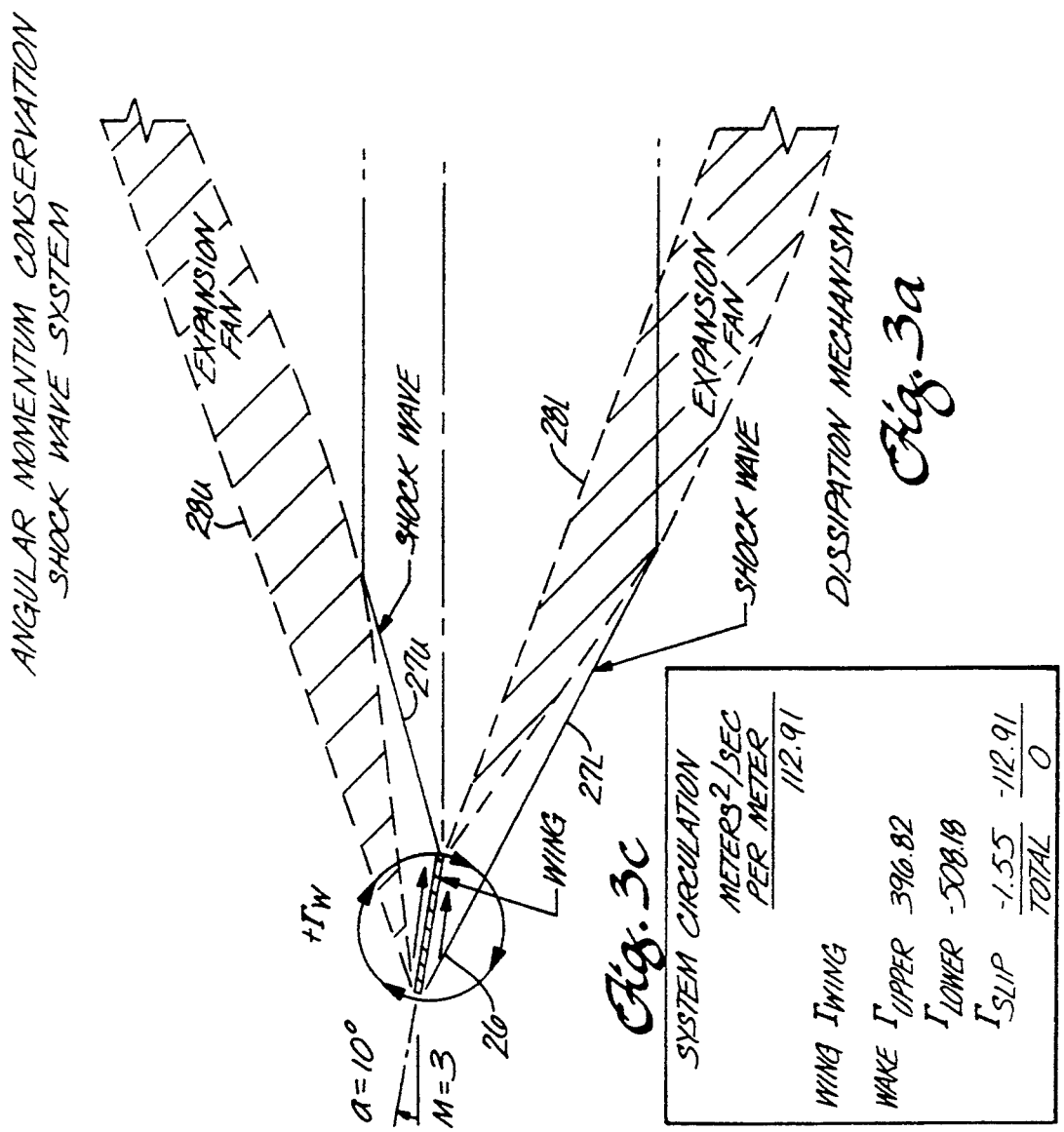

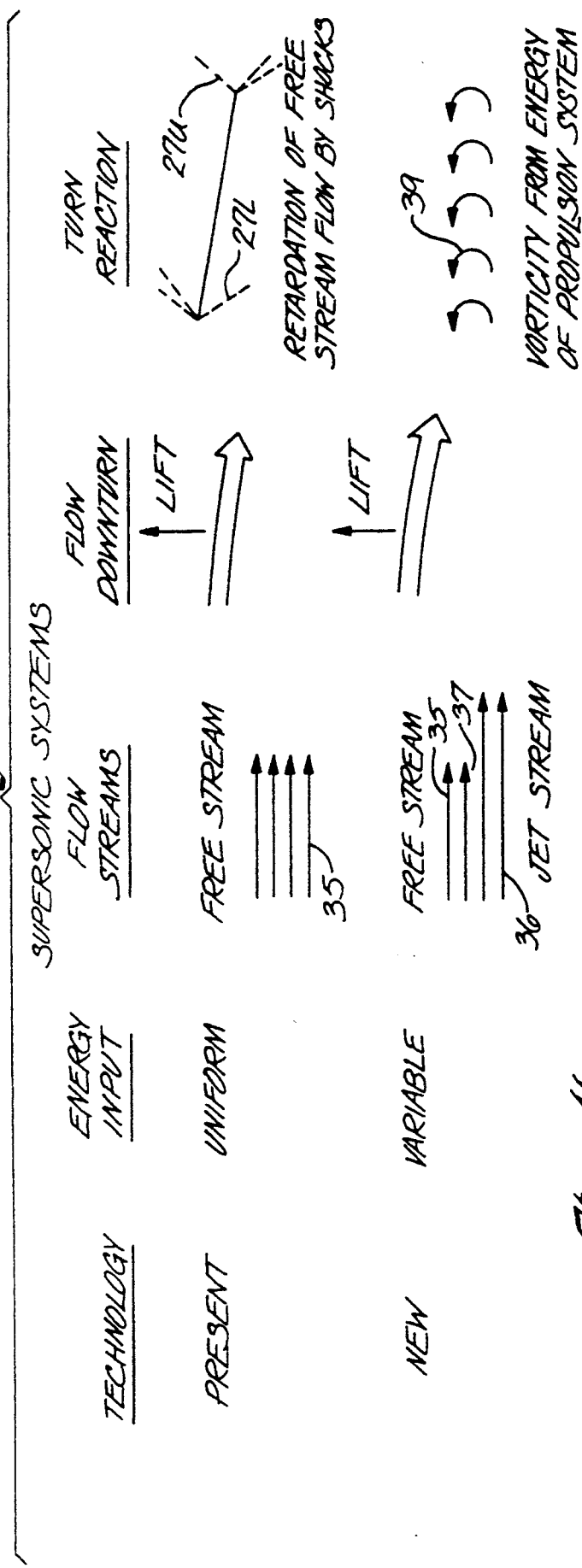

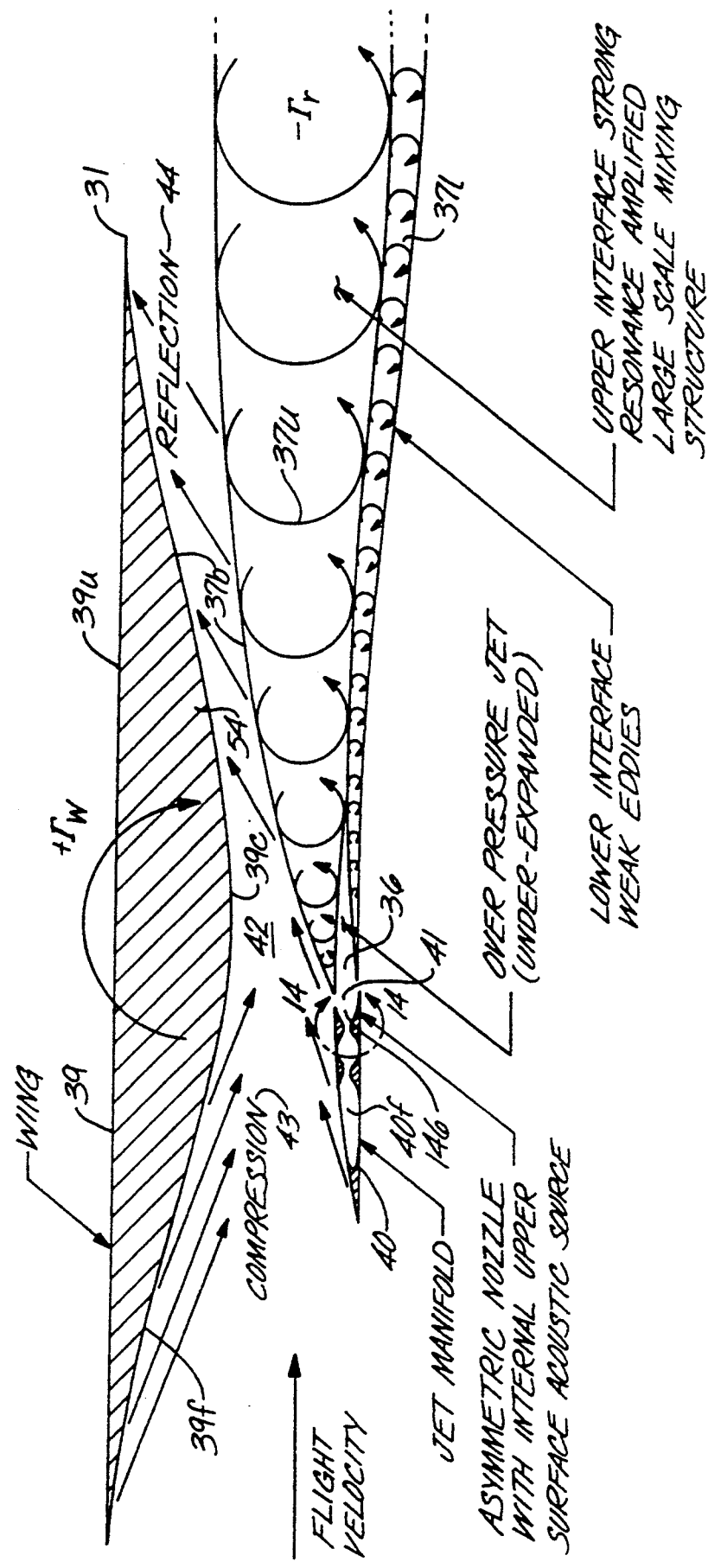

Fig. 6
CLASSICAL VORTEX SHEET THEORY
BOUNDARY CONDITIONS
UNDERWING JET SHEAR LAYER
CONTINUITY ACROSS ZERO THICKNESS SHEET
50c — PRESSURE: $P_2 - P_1 = 0$
51c — FLOW DIRECTION: $\theta_2 - \theta_1 = 0$
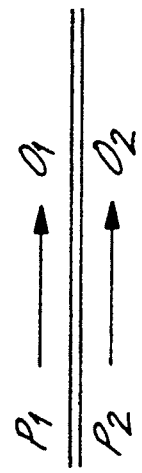
REAL FLUID / ACOUSTIC EXCITATION MECHANISM
EDDY GROWTH STRUCTURE
50rf — PRESSURE: $P_2 - P_1 = \delta \neq 0$
(ENERGY HYPOTHESIS)
51rf — FLOW DIRECTION: $\theta_2 - \theta_1 = \alpha \neq 0$
(EXPERIMENTAL DATA)
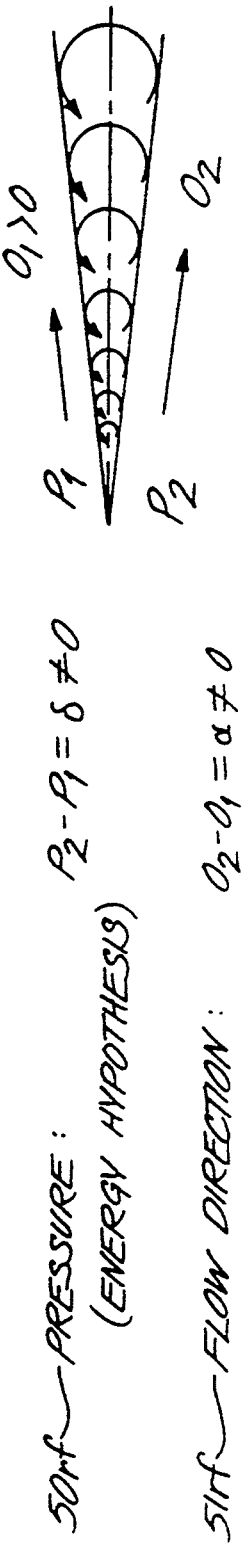

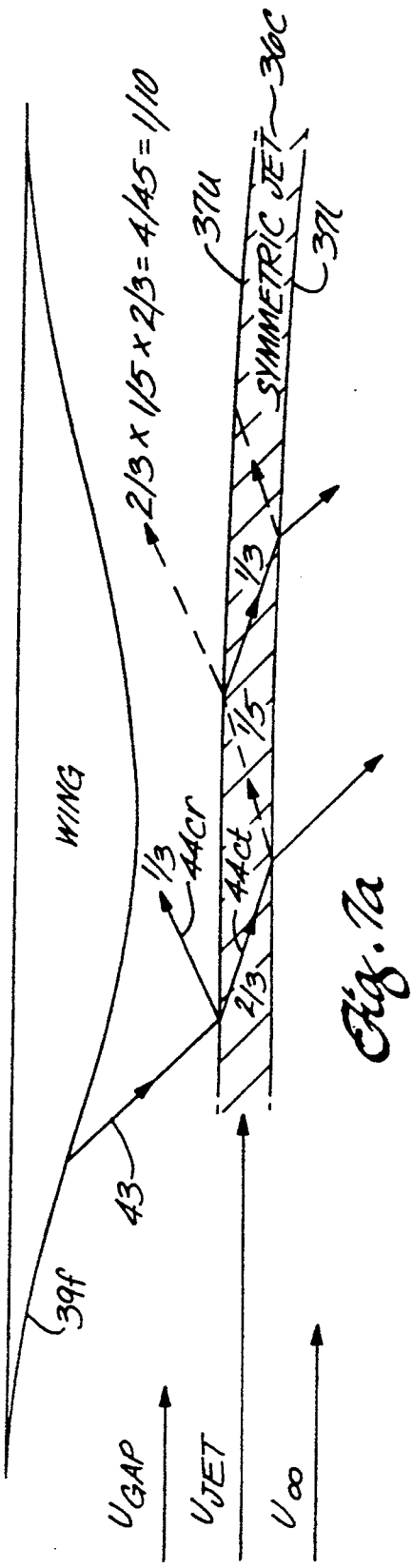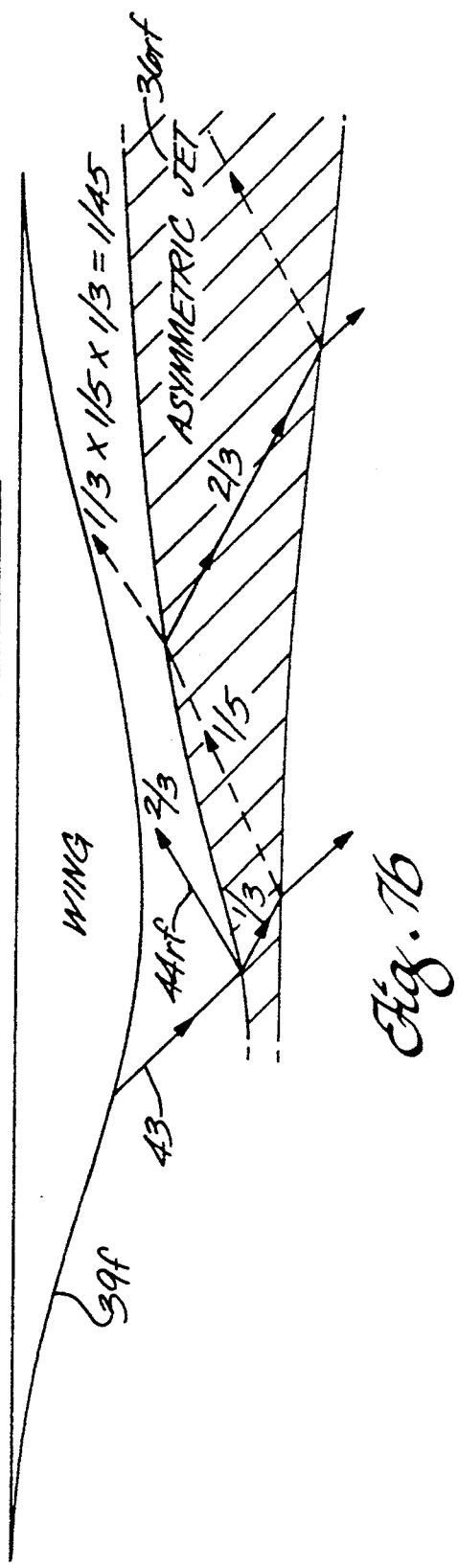

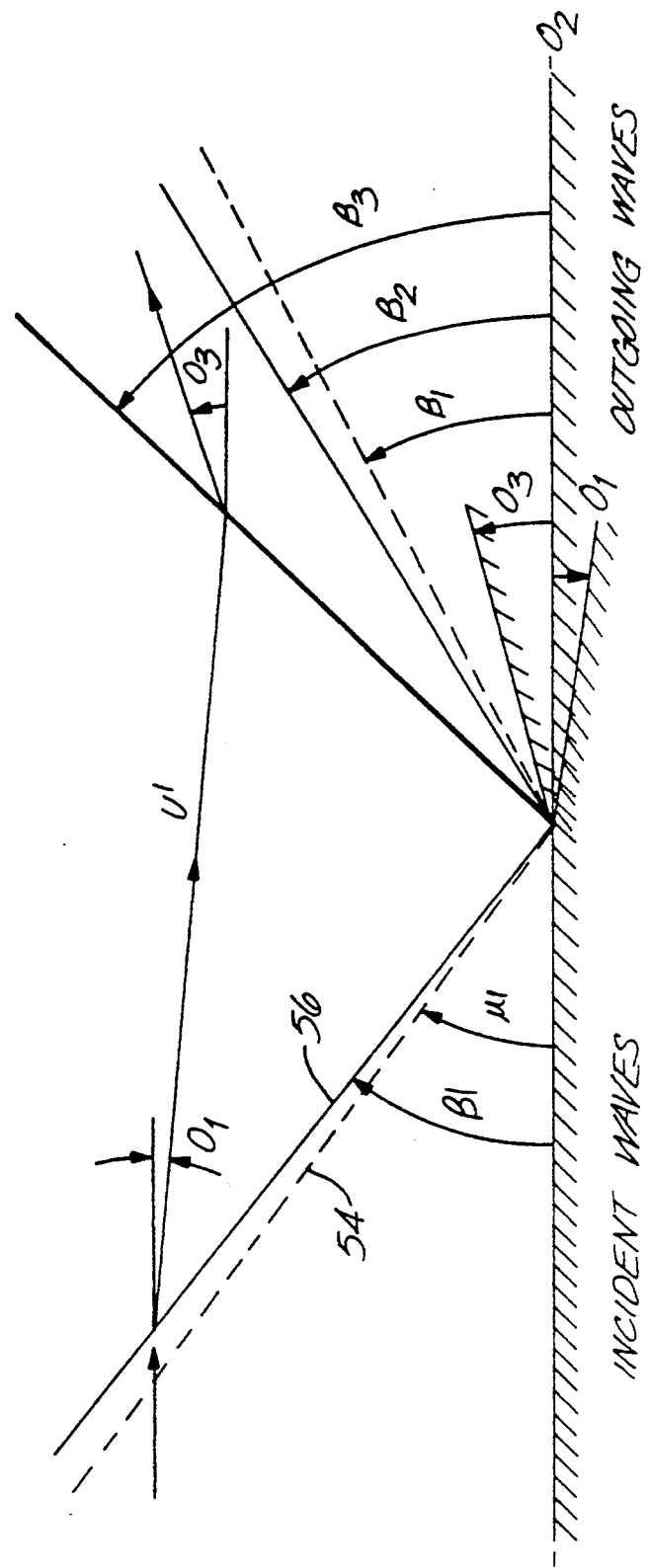

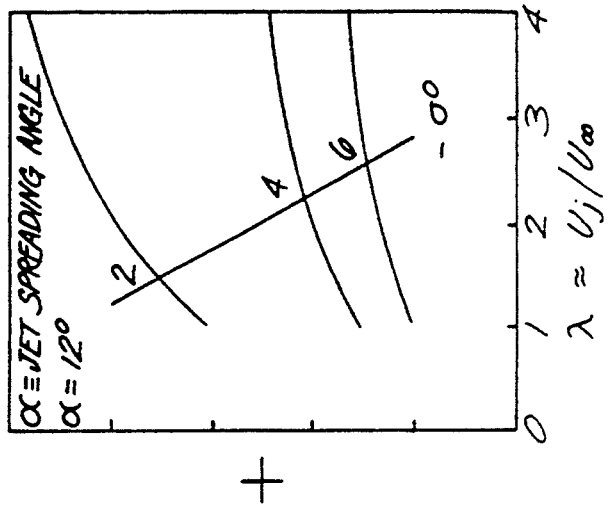
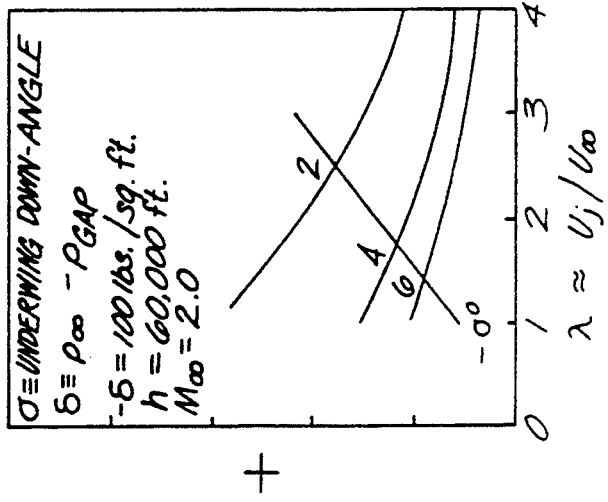
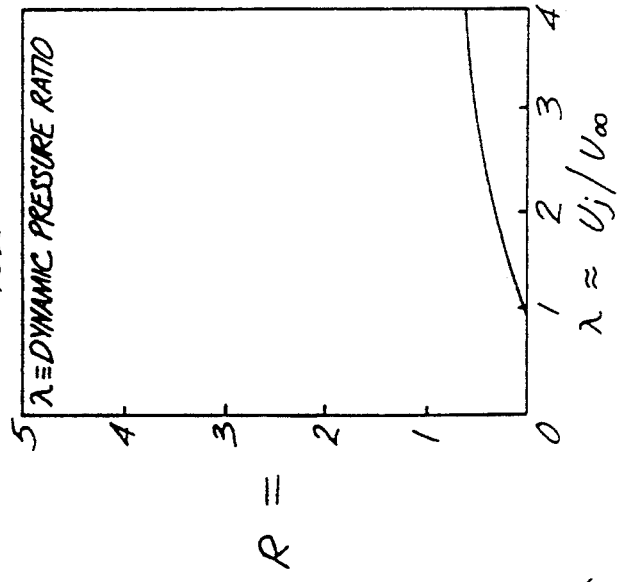
Fig. 13

VERTICAL
(UPPER INSIDE SURFACE)

HORIZONTAL
(UPPER TRAILING EDGE)

FLEXIBLE MEMBRANE
(UPPER INSIDE SURFACE)

VERTICAL
(UPPER OUTSIDE SURFACE)

STEPPED WALL
(UPPER INSIDE SURFACE)

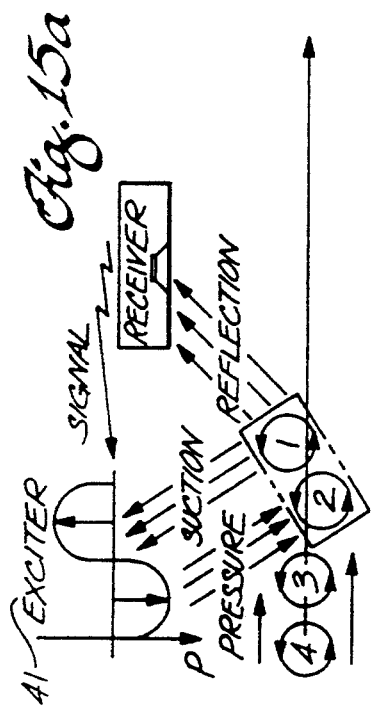
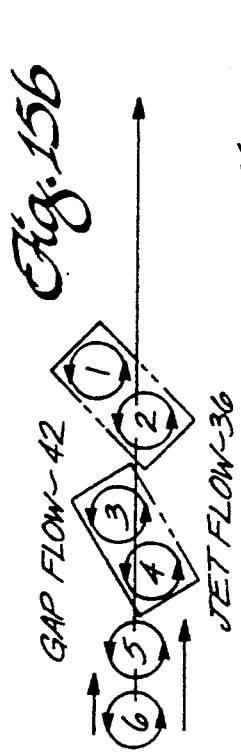
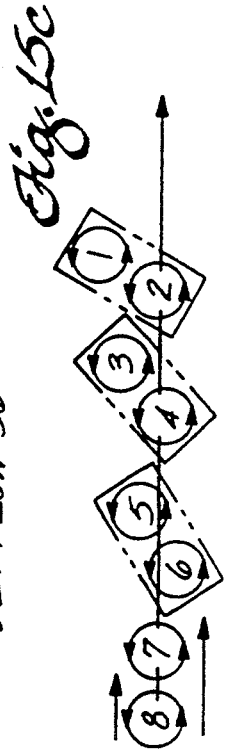
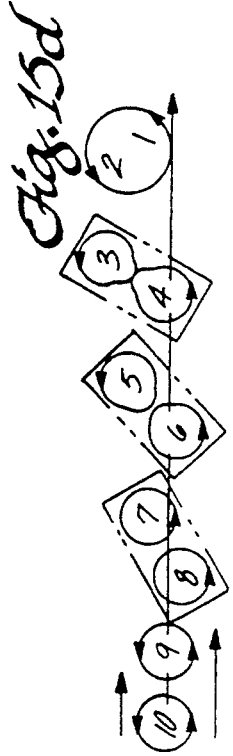
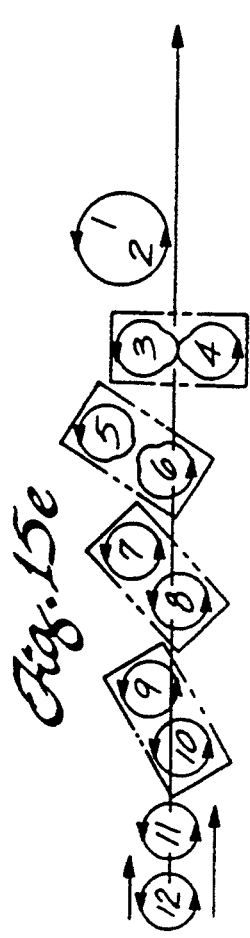
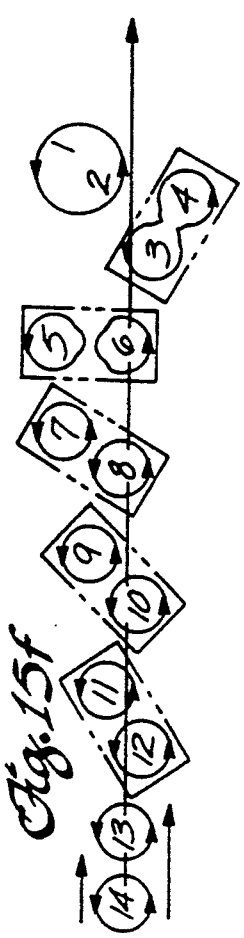
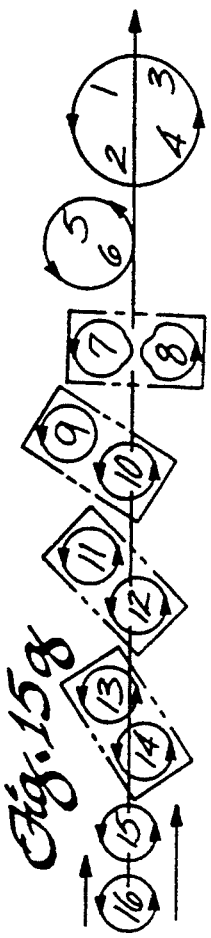
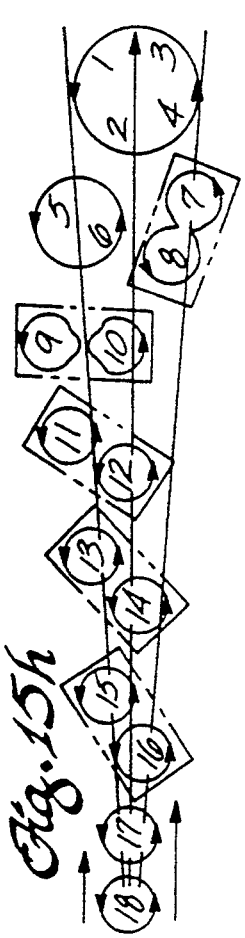

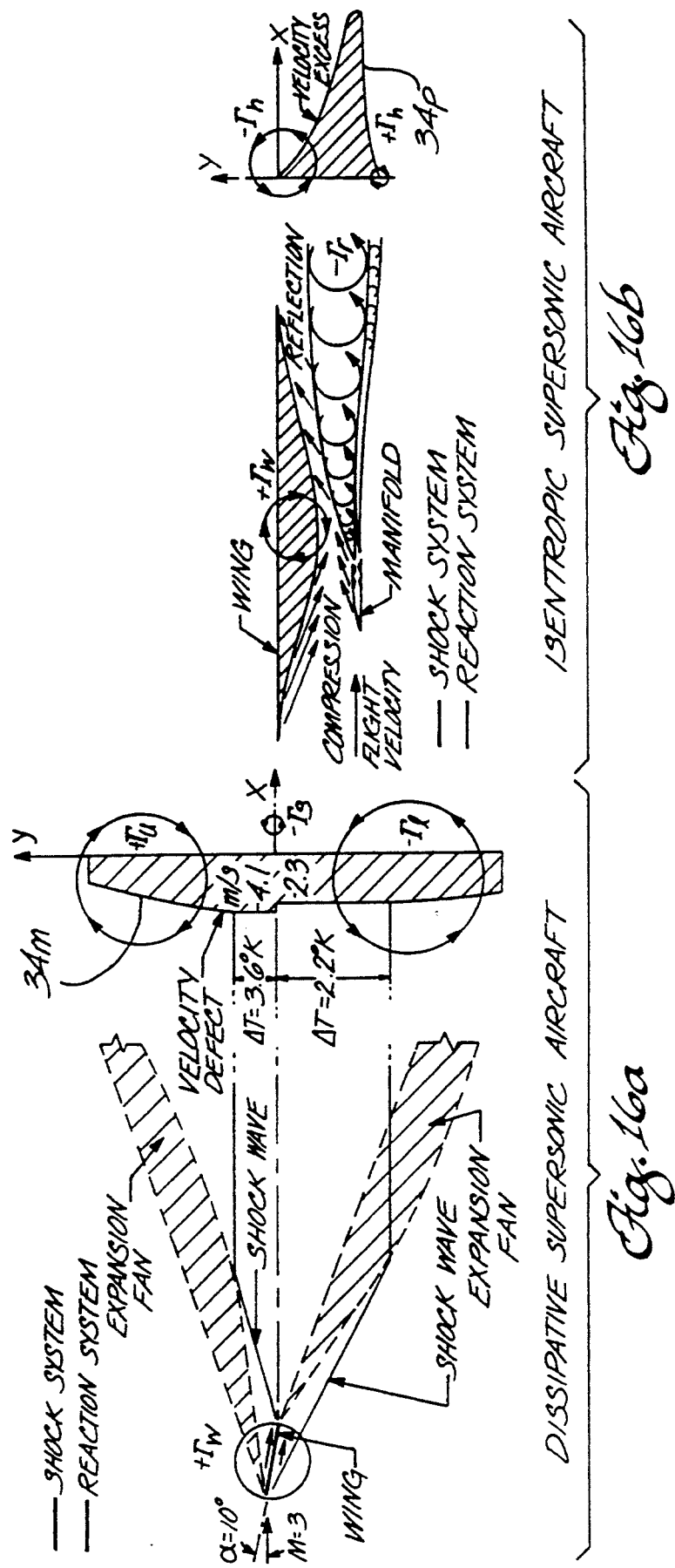

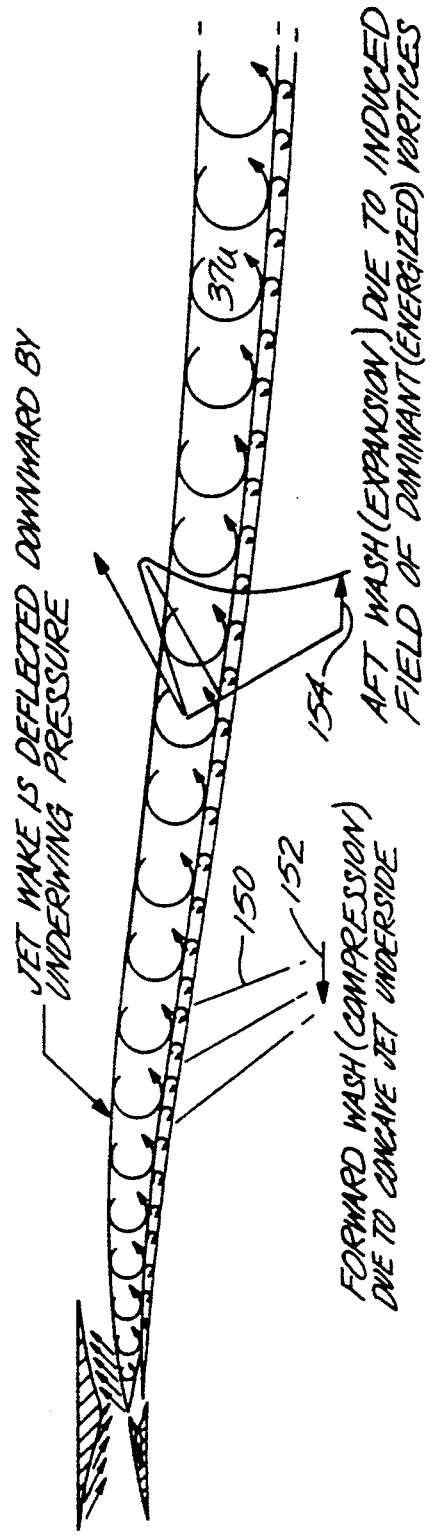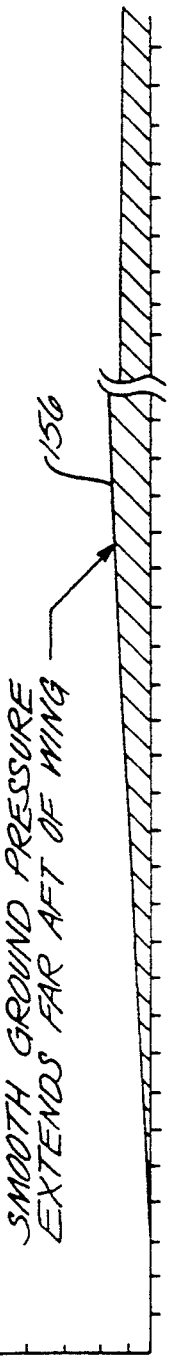

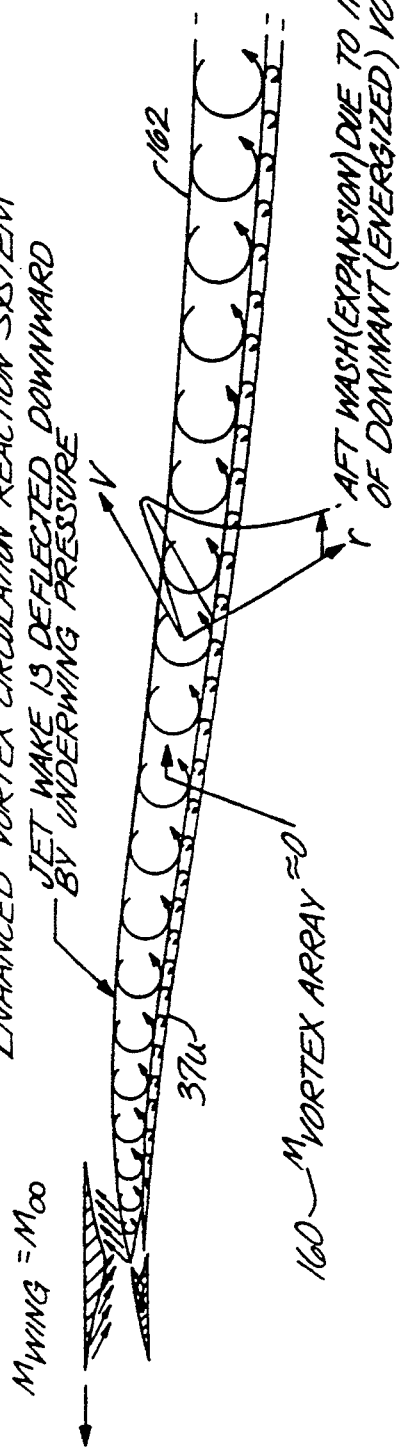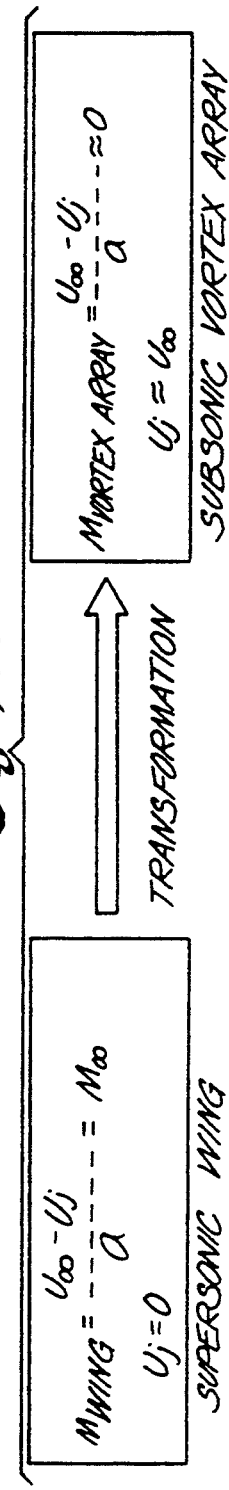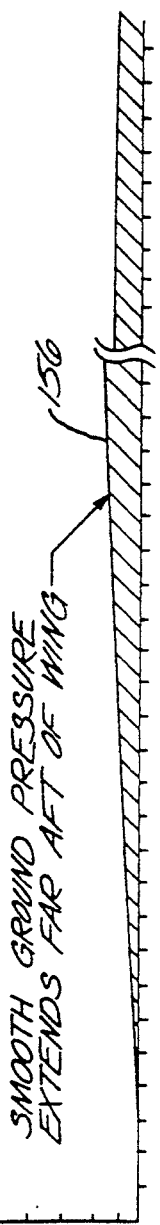

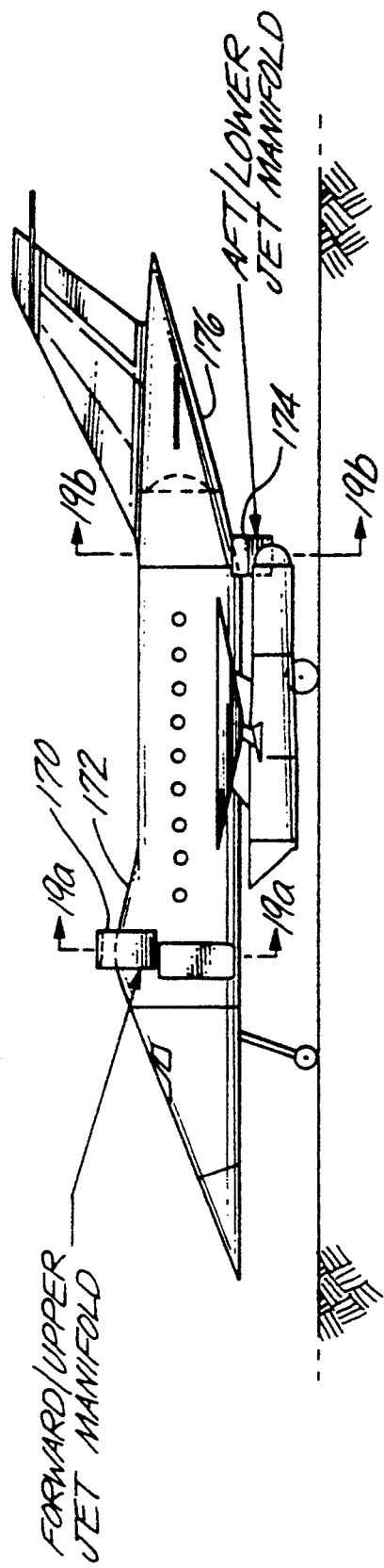
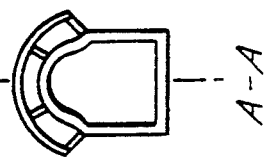

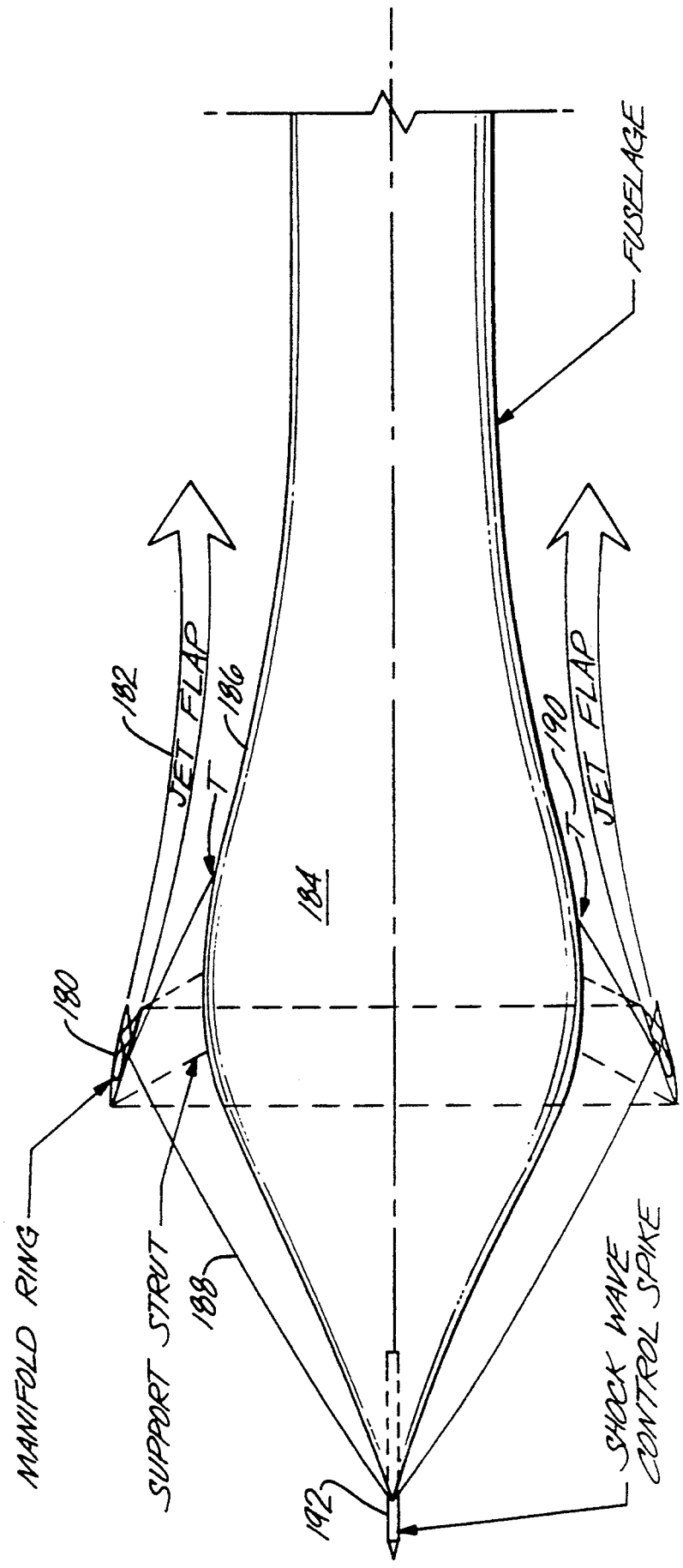

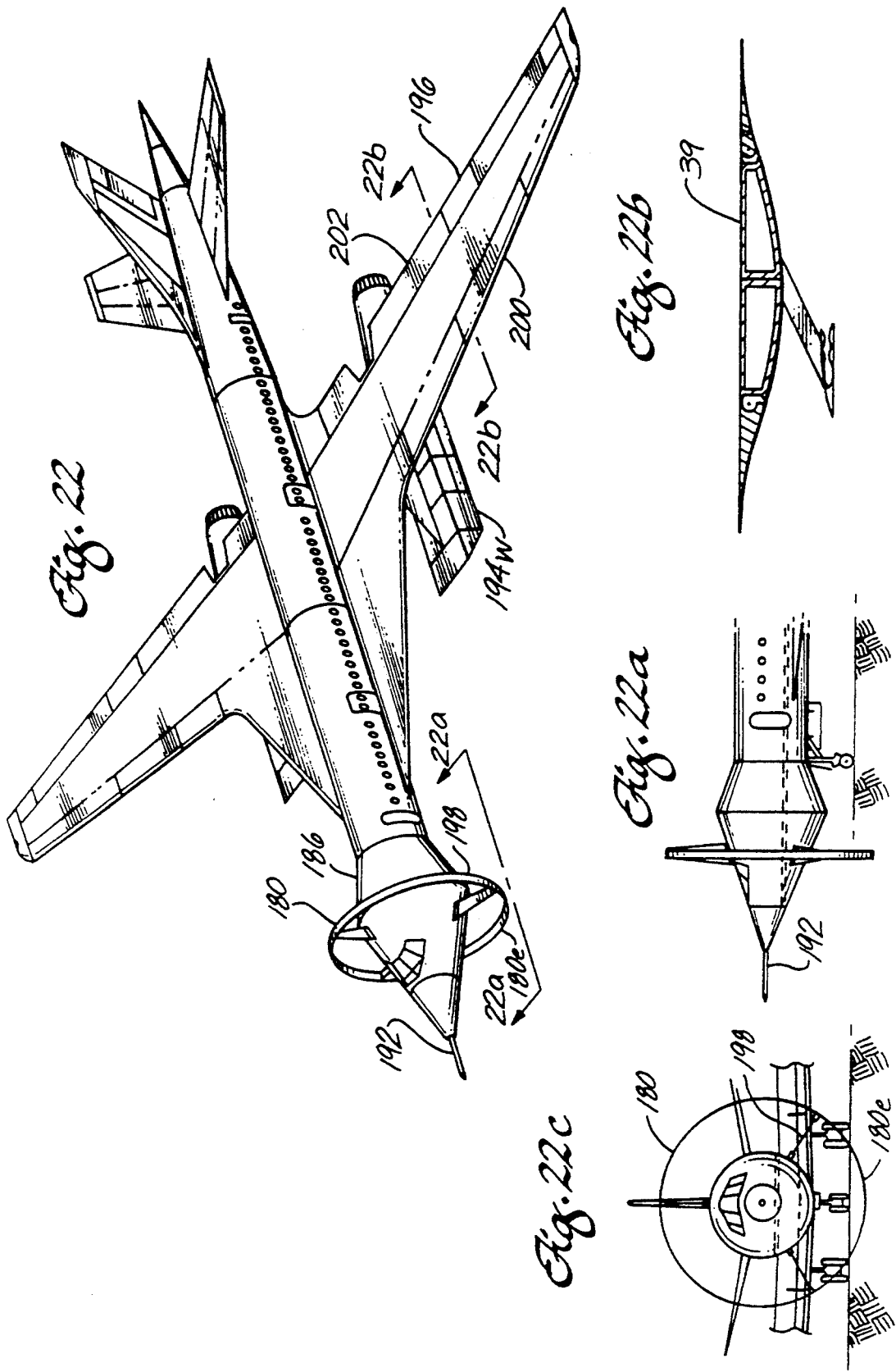

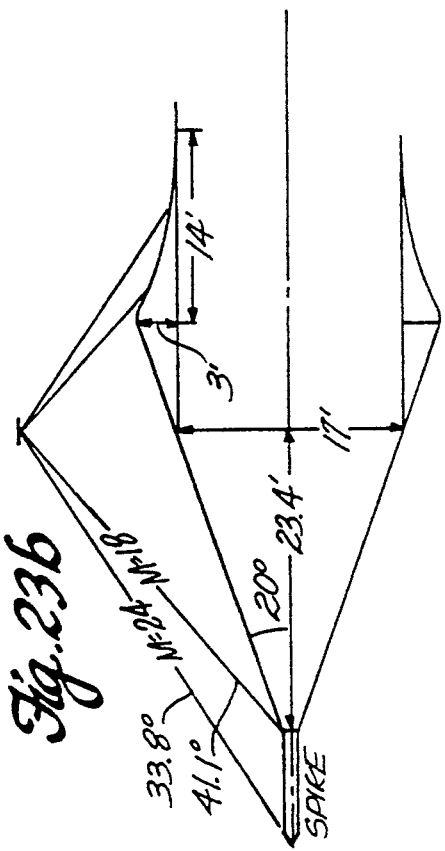
Fig. 23c
BOW SHOCK ENERGY RECOVERY SYSTEM
CONICAL SHOCK WAVE/INTERCEPTOR RING GEOMETRY
HIGH SPEED TRANSPORT
| RECOVERY SYSTEM ELEMENTS | | | |
|---|---|---|---|
| MACH NUMBER $M$ | SHOCK WAVE ANGLE, $\beta$ (DEGREES) | SHOCK RING DIAMETER (FEET) | ENTROPY LOSS FACTOR $(M^2-1)^3$ |
| 1.2 | 72.2 | 117.9 | 0.09 |
| 1.4 | 53.3 | 56.9 | 0.88 |
| 1.6 | 45.6 | 45.8 | 3.80 |
| 1.8 | 41.1 | 40.9 | 11.24 |
| 2.0 | 38.0 | 37.6 | 27.00 |
| 2.2 | 35.5 | 35.4 | 56.62 |
| 2.4 | 33.8 | 33.9 | 107.85 |
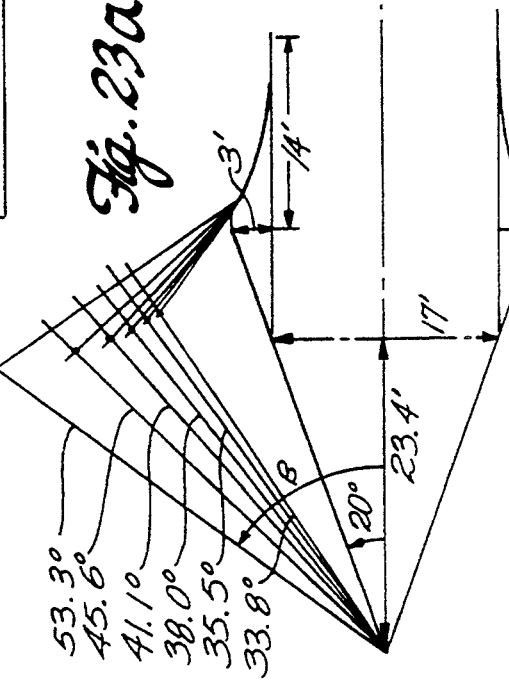
Fig. 23b
(b) WAVE ANGLE/BOW SPIKE/OPERATING REGIME
Fig. 23a
(a) MACH NUMBER/WAVE/RING DIAMETER SPECTRUM

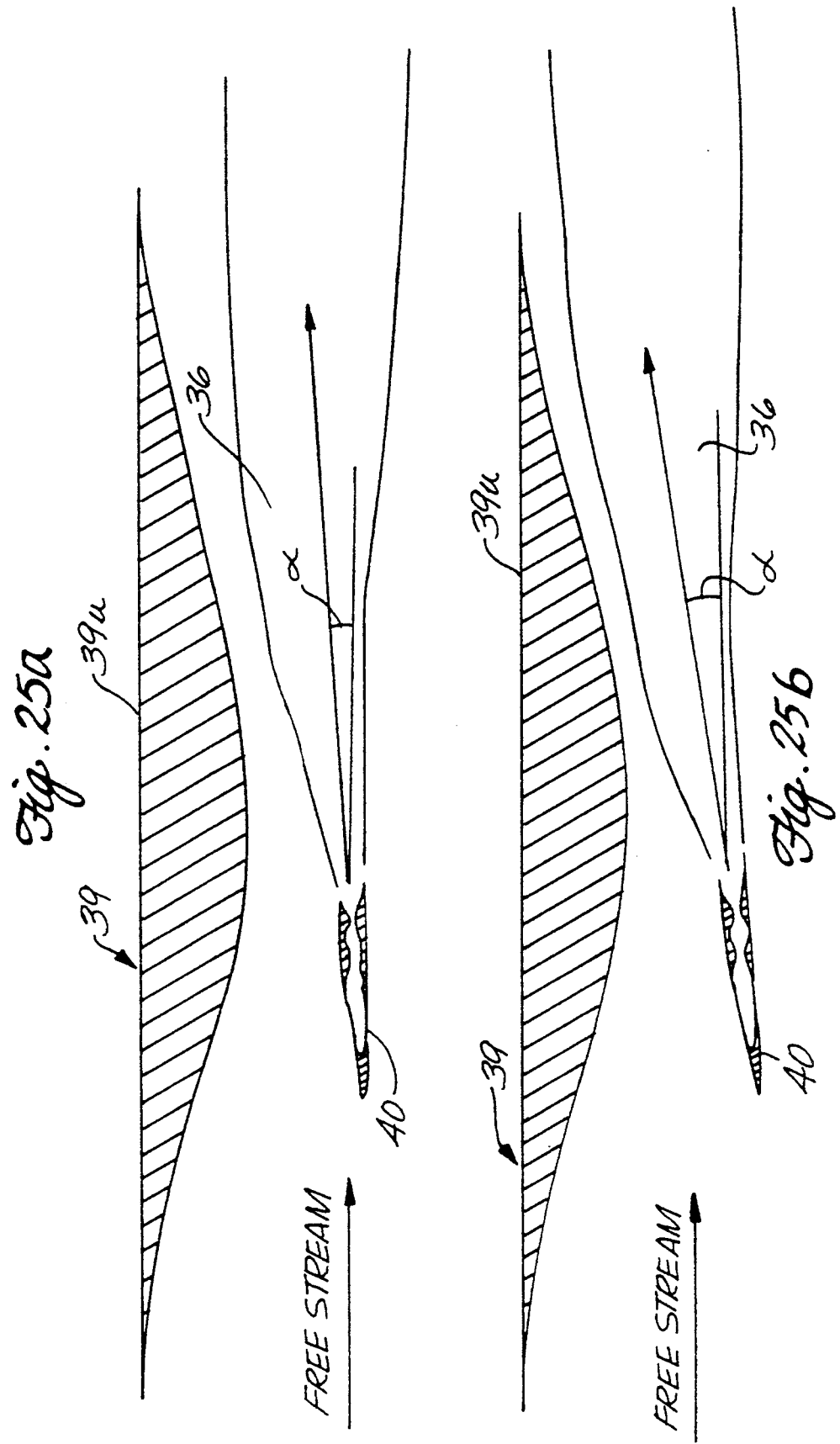

SUPERSONIC AIRCRAFT SHOCK WAVE ENERGY RECOVERY SYSTEM

RELATED APPLICATION INFORMATION

This application is a division of U.S. patent application Ser. No. 07/825,289 filed Jan. 22, 1992, now U.S. Pat. No. 5,251,842 which is a continuation-in-part of Ser. No. 07/557,418 filed Jul. 23, 1990 now abandoned.

BACKGROUND OF THE INVENTION

My previous U.S. Pat. No. 4,483,497, issued Nov. 20, 1984, disclosed a manifold arranged to emit a planar jet at a velocity greater than that of flight and in the aft direction below and apart from a lifting wing. The energized jet fluid, supplied by the aircraft propulsion system, would be exhaust or bleed air from a turbojet/turbofan, a planar ramjet, or any other engine compatible with the aircraft propulsion requirements.

The gap between the wing underside and this jet constitutes a planar nozzle which at supersonic speed decreases the flow velocity with a corresponding increase in pressure. The upper jet interface generates a series of negative (counterclockwise) vortices whose strength is determined by the jet/gap velocity ratio. The lower jet interface generates a series of positive (clockwise) vortices whose strength is determined by jet/free-stream velocity ratio. Since the gap flow velocity is less than that of the free stream, the vortices on the upper jet interface are stronger, and their excess strength can provide the required negative circulation reaction to the positive circulation developed by the lifting wing.

Effectiveness of the circulation reaction system provided by this underwing jet can be maximized by enhancing transformation of the residual energy of the jet, which appears as linear velocity, into a rotational form, i.e., by transforming the linear momentum into angular momentum. This transformed jet then provides a more effective reflection boundary to recover energy of the underwing compression waves. Fuselage bow compression energy is also recovered by reflection employing a nose ring, possibly again in conjunction with a jet. This energy recovery improvement, based on reflection, is the subject of the present invention.

BRIEF SUMMARY OF THE INVENTION

The present invention outlines the recovery of supersonic compression wave energy, generated both by the lifting wing and the fuselage bow, by its reflection onto a suitably inclined structural surface to provide thrust and hence useful work.

For the wing, the invention provides means to selectively enhance mixing of the planar jet upper surface with the underwing gap flow to maximize the negative angular momentum or circulation reaction, preferably within the chord length of the wing. These means include but are not limited to acoustic, electrical, mechanical, laser, and geometric systems to induce resonance in the eddies formed on the upper jet interface and thereby accelerate the mixing process and vortex growth.

Such enhancement, by fully utilizing the available residual linear energy in the jet, will minimize both the mass and velocity of the jet fluid required from the engines, thereby providing the required negative reactive circulation with the least demands on the propulsion system. Further, reduced jet mass flow will minimize the size, weight, and drag of the underwing manifold itself.

Enhanced growth of the upper interface eddies by mixing will also provide the circulation reaction within the chord length of the wing, where the greater vortex growth rate presents a more favorable asymmetric boundary condition to increase the reflection of the underwing compression waves back upwards to maximize the pressure on the upwards reflexed wing backside to provide lift and thrust. This mixing at the same time spreads the momentum over a greater mass of air thereby serving as a form of jet augmentation, where the wing backside serves as the jet augmentation shroud.

Finally, the increased rotational momentum provided by this enhanced mixing augments the induced aft velocity of this upper vortex array as an expansion in the flow below, serving to cancel the forward velocity perturbation related to the compression imposed on the flow below the jet/vortex array due to its downward deflection. In fact, the jet/vortex array formed and discharged aft of the wing has essentially zero velocity with respect to the outer flow, and hence cannot form any waves.

Enhanced mixing growth is also provided through inclining of the jet upwards toward the wing to increase reflection of underwing compression waves by forcing a turn by the gap flow through a greater angle with corresponding increase in the pressure on the wing under surface. Mounting of the nozzle for pivotal motion to increase and decrease the angle of inclination at a resonant frequency is employed for further excitation of the jet interface with the gap flow further enhancing shock wave reflection.

Creation of the jet with a velocity profile having lower velocity at the upper interface of the jet with consequent higher pressure and higher velocity at the lower interface of the jet with associated lower pressure enhances underwing mixing on the upper surface of the jet while providing greater inertia on the lower interface of the jet to minimize adverse defection of the jet downward.

For the fuselage, the invention provides a nose ring to intercept and reflect the conical axisymmetric fuselage bow shock back inwards onto a suitably inclined fuselage shoulder to recover its compression energy into thrust and useful work.

These considerations thereby avoid formation and propagation of shock waves to the ground to cause a sonic boom.

BRIEF DESCRIPTION OF THE DRAWINGS

The foregoing and other readily apparent features of the present invention will be better understood by reference to the following more detailed specification and accompanying drawings wherein:

FIGS. 1a and 1b are schematic representations of the vortex patterns generated by both subsonic and supersonic wings, contrasting the circulation reaction requirements in these two flight regimes.

FIG. 2 is an illustration of the flow field generated by an example supersonic wing, delineating its shock and expansion waves and the vortex sheets produced by their intersections.

FIGS. 3a and 3b are a presentation of the wake characteristics calculated for the example wing of FIG. 2, illustrating the velocity defects imposed on the flow by the shock/expansion wave system, and FIG. 3c is a tabulation of resulting wake circulation reactions for comparison with the positive wing circulation developed as the wing advances a unit distance.

FIG. 4a is a schematic presentation of both the present shock-generating supersonic system and the new shock-free system of the present invention, illustrating the turn reactions provided by the two systems, and FIG. 4b displays Crocco's Theorem which offers a mathematical explanation of how these systems differ.

FIG. 5 is a schematic illustration of the wing/jet system of the present invention, showing the wing, underwing jet manifold, and high velocity aft jet with its upper and lower interface vortex arrays, where the upper jet interface vortex array displays enhanced flow mixing and wave reflection.

FIG. 6 is an illustration comparing the boundary conditions provided by the classical vortex sheet as presented in textbooks with the real fluid shear layer of the present invention.

FIGS. 7a and 7b are illustrations comparing reflection of supersonic waves from a conventional symmetric jet with that of an asymmetric jet provided by the action of a real fluid employing acoustic excitation.

FIG. 8 is a chart illustrating the dependence of reflected supersonic wave angles on the inclination of the reflecting surface.

FIG. 13 is a mathematical representation for underwing supersonic compression wave reflection as the sum of three terms, together with graphical representations, showing the magnitudes of these terms as a function of operating parameters.

FIGS. 15a, b, c, d, e, f, g and h are schematic illustrations of the supersonic vortex growth mechanism, showing how the vortices, excited by a pressure signal, rotate, pair, and merge to enhance growth. FIG. 15a also shows a receiver to measure the emerging frequency of the vortices and transmit this data to control the excitation frequency.

FIGS. 16a and 16b are comparisons illustrating the two systems, contrasting the negative wake of the conventional dissipative shock-generating system with the positive wake of the isentropic shock-free system of the present invention.

FIG. 17a is a schematic representation of the flow field aft and below the wing/jet system of the present invention, illustrating the aft wash (expansion) induced by the dominant upper vortex array to cancel the forward wash (compression) associated with the wave system of the concave jet underside, providing a rotation-free downward momentum below the jet system generating lift with no sonic boom. FIG. 17b is a graphical representation of the ground pressure for the schematic of FIG. 17a.

FIG. 18a is a chart illustrating the shock-free mechanism of the present invention in transforming the downward momentum function of a supersonic wing into a subsonic vortex array. FIG. 18b is a graphical representation of the ground pressure for the schematic 18a. FIG. 18c is an illustration of the mathematical transformation of the reaction system.

FIG. 19 is a profile view of an aircraft incorporating the underwing jet with enhancement provisions of the present invention, and also illustrating forward wave containment and aft jet mixing arrangements to minimize fuselage wave drag.

FIGS. 19a and 19b are section views along lines 19A and 19B, respectively, in FIGS. 19a and 19b.

FIG. 20 is a schematic representation of a axisymmetric fuselage with a bow shock reflection ring, a shock wave control nose spike for off-design conditions, an energy recovery/thrust shoulder extending completely around the fuselage, and a jet flap discharging aft from the reflection ring.

FIGS. 22, 22a, 22b and 22c are section and front perspective views of a transport size aircraft illustrating the same features as in FIG. 21.

FIG. 23a is a depiction of conical bow shock with a retracted nose spike.

FIG. 23b is a depiction of the bow shock condition with the nose spike extended.

FIG. 23c is a chart illustrating use of the extendable nose spike to control interception of the conical bow shock wave by a forward fuselage bow ring at off-design conditions.

FIG. 25a is a section view demonstrating the angle of inclination of the jet with respect to free stream.

FIG. 25b is a section view of the wing and nozzle with the nozzle pivoted to provide a higher angle of inclination in the jet.

DETAILED DESCRIPTION OF THE PREFERRED EMBODIMENT

Figure 9:
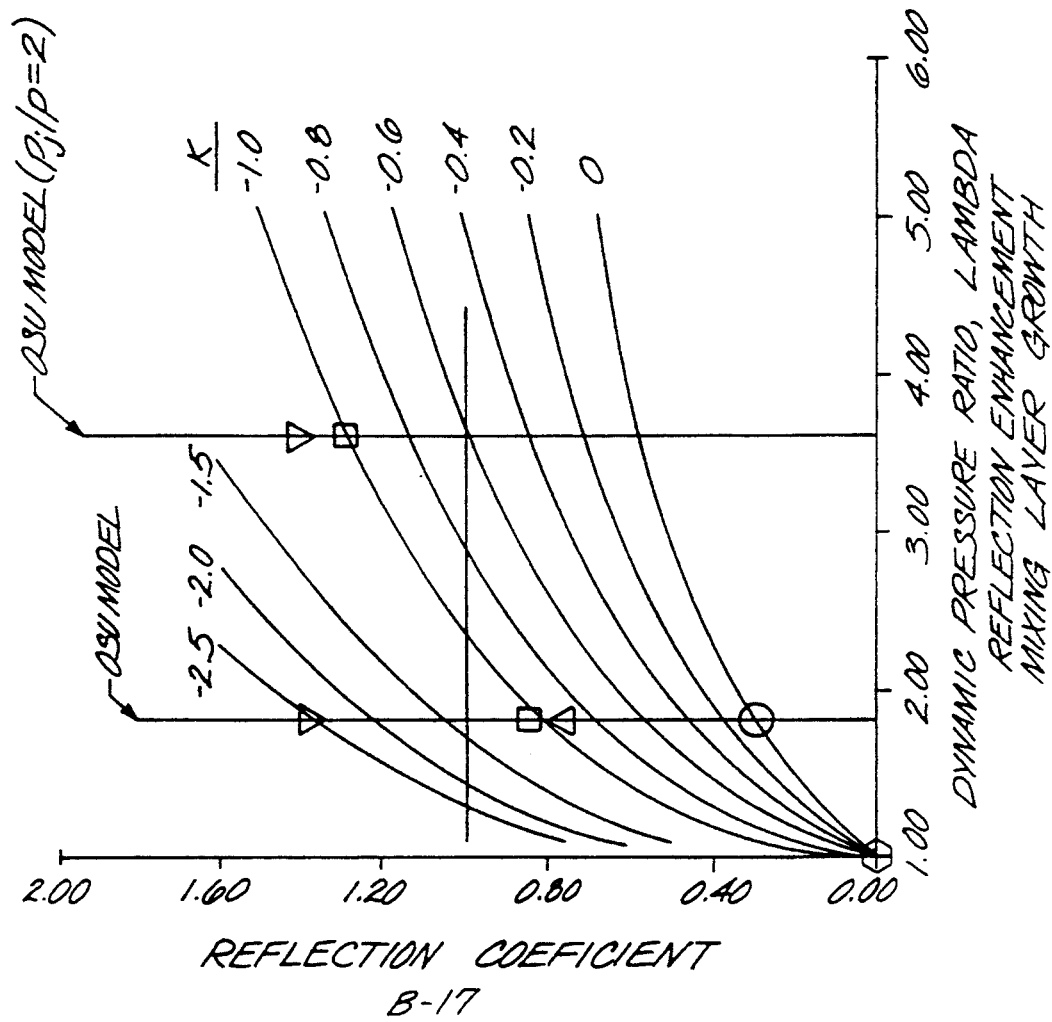
FIG. 9 is a chart illustrating the increased compression wave reflection calculated for the enhanced mixing of the present invention.

In the following paragraphs like numbers refer to the same or similar items from figure to figure.

The basic circulation reaction requirements imposed on the flow by a lifting wing to satisfy conservation of angular momentum are illustrated in the schematic vortex patterns of FIG. 1 for both subsonic and supersonic speeds. The differing reaction systems shown follow from the restrictions on pressure transmission due to the speed of sound.

At subsonic speed the wing 20 initially turns a horizontal flow downwards to develop lift via a positive circulation $+\Gamma_1$. Conservation of angular momentum then requires an equal and opposite sign reactive circulation $-\Gamma_1$ which is represented as the so-called starting vortex $-20r$, with these two spanwise circulations connected by wing-tip trailing vortices 22 to produce a closed vortex ring. Thereafter, as the wing 20 moves forward, it is preceded by its own pressure field, generating a forward upwash, which the wing turns downward to develop the lift force. For a two-dimensional wing the upflow forward of the wing and the downflow aft of the wing are symmetric, so there is zero net downwash, the lift being produced by the change in linear momentum from the forward upflow to the aft downflow.

Since the pressure field is thereby carried along with the wing as the same bound vortex $+\Gamma_1$, no further new circulation is developed, nor is any further reactive circulation required. The vortex ring, or rectangle, is thereafter simply stretched as the wing advances to positions $20b$ and $20c$, leaving the initial starting vortex $-\Gamma_1$ far behind in the fluid.

At supersonic speed the pressure field generated by the lifting circulation $+\Gamma_1$ cannot precede the wing 23, which accordingly must continually turn the flow down from the horizontal to generate new positive circulations $+\Gamma_2$ and $+\Gamma_3$ as the wing advances. Conservation of angular momentum then requires sustained negative circulation reactions $-\Gamma_2$ and $-\Gamma_3$. Thus, the positive wing lift circulation 23 is reacted by negative circulation $-23r$, the positive wing lift circulation 24 is reacted by negative reactive circulation $-24r$, the positive wing lift circulation 25 is reacted by negative reactive circulation $-25r$, and so on. Again the spanwise lift and reactive vortices are connected by wing-tip trailing vortices, but now generating a series of new vortex rectangles—a new rectangle for each unit distance of advance, rather than simply stretching the original vortex rectangle as in the subsonic case. Of course, the wing advance, its circulation development, and the vortex reactions are all smooth and continuous; the unit advance patterns cited are merely illustrative.

In FIG. 2 a flat plate wing 26 developing a positive lift circulation $+\Gamma_w$ is illustrated generating shock waves $27l$ and $27u$ from the lower and upper surfaces of the wing respectively. Expansion fans $28l$ and $28u$ are also shown emanating from the wing lower and upper surfaces respectively.

Below the wing, intersections of the elements $28l(1)$, $28l(2)$, and $28l(3)$ of the lower expansion fan $28l$ with the lower shock wave $27l$ generate vortex sheets $29l(1)$, $29l(2)$, and $29l(3)$ respectively, whose sustained vortex arrays all have a negative (counterclockwise) sense of rotation.

Above the wing, intersections of the elements $28u(1)$, $28u(2)$, and $28u(3)$ of the upper expansion fan $28u$ with the upper shock wave $27u$ similarly generate sustained vortex sheets $29u(1)$, $29u(2)$, and $29u(3)$ respectively, but now the sense of rotation of these vortex arrays is positive (clockwise).

The slipstream 30 between the lower and upper flows aft of the wing trailing edge 31, due to the higher velocity in the lower flow $32l$, is also shown in FIG. 2 generating a further negative reactive vortex array 33.

The wake characteristics of the shock/expansion wave system of FIG. 2 are illustrated in FIG. 3. The shock waves $27l$ and $27u$ are of uniform strength until intercepted by the expansion fans $28l$ and $28u$, degrading kinetic energy of the flow into heat, i.e., causing uniform velocity defects $34l$ and $34u$ and temperature rises $35l$ and $35u$. When the expansion fans intercept the shock waves, the velocity defects progressively decrease, providing velocity variations, the integrals of which are the reactive circulations.

Thus below the wing 26, after interception of the shock wave $27l$ by the expansion fan $28l$, the velocity defect $34l$ decreases progressively in the negative y direction, providing a negative slope of the velocity profile, the integral of which is the required negative circulation reaction $-\Gamma_l$. Surprisingly, for the Mach 3 wing at 10 degree angle of attack example case considered, calculations show that this negative circulation reaction $-\Gamma_l$ is almost five times that required to balance the positive wing lift circulation $+\Gamma_w$, as indicated by their circulation areas.

However, above the wing 26, after interception of the shock wave $27u$ by the expansion fan $28u$, the velocity defect $34u$ decreases progressively in the positive y direction, providing a positive slope of the velocity profile, the integral of which is a large positive circulation reaction $+\Gamma_u$, almost four times that of the wing circulation $+\Gamma_w$, again as indicated by their areas. This result explains the even larger negative circulation reaction $-\Gamma_l$ generated by the lower flow; it is required to balance this adverse upper flow reaction $+\Gamma_u$ as well as the positive wing circulation $+\Gamma_w$. This system for the example case generates eight times the reactions required, including both the positive and negative circulations, and hence dissipates eight times the energy necessary to balance the positive wing circulation. The result is the abnormally high wave drag of the shock-generating reaction system, and indicates that supersonic lift should be generated by the wing lower surface but not its upper surface.

The calculated value 33 of the slipstream negative circulation reaction $-\Gamma_s$ is also shown; it is small, only about one percent of the wing circulation $+\Gamma_w$.

Circulation reactions to the positive circulation $+\Gamma_w$ developed by a lifting wing, at both subsonic and supersonic speed, are provided by free vortices in the flow. At subsonic speed the one-time starting vortex is generated by the wing trailing edge 31. At supersonic speed, as illustrated in FIGS. 2 and 3, and summarized in FIG. 4, a wing in a uniform energy flow 35 employs intersections of the dissipative shock waves $27l$ and $27u$ with the expansion fans $28l$ and $28u$ to generate continuous free vortex arrays, both positive and negative as shown above, providing the net sustained negative circulation reaction required to balance the continuous generation of positive wing circulation. The new variable energy circulation reaction system of the present invention employs residual energy from the propulsion system to provide a higher velocity jet stream 36 to generate this required sustained free vortex array 37 on the interface between the free stream 35 and the jet stream 36.

The distinction between these two circulation reaction systems is illustrated by combining the conservation equations of mass, momentum, and energy into a single equation known as Crocco's Theorem 38, where T = temperature
s = entropy
q = velocity
h = enthalpy This three-term expression illustrates the two and only two possible supersonic circulation reaction systems. For the two-dimensional wing considered, the second term 38b of this equation represents the vertical gradient of the rotational energy generated by a lifting wing in turning the flow downward. In a uniform energy flow 35 the third term 38c, representing the vertical gradient of the constant total enthalpy, is zero, and hence the circulation reaction, as demonstrated by the resulting two term equation, must be provided by the first term 38a, which represents the energy dissipation of the shock wave system 27. However, inclusion of the energized underwing jet 36 provides a non-uniform vertical enthalpy gradient and hence a non-zero right-hand term 38c, which can balance the equation without a contribution from the shock-dissipative first term 38a, thereby achieving a shock-free circulation reaction.

This shock-free circulation reaction system of the present invention is displayed in FIG. 5, illustrating a cross section view of a shaped wing 39 having a flat upper surface 39u and a lower surface gently curved concave down in both its forward 39f and back 39b sections, connected by a convex center portion 39c, in all comprising the upper section of a supersonic nozzle. A manifold 40 is mounted below the wing emitting a high velocity planar jet 36 in the aft direction, generating vortex arrays 37l and 37u on its lower and upper jet interfaces respectively. Vortex growth provisions 41 are incorporated in the upper surface of the manifold 40 to selectively enhance mixing of the upper jet interface eddies 37u of the jet 36 with the gap flow 42, providing the larger upper vortex array 37u shown.

The high velocity planar jet 36 is comprised of energized fluid provided by the propulsion system, such as exhaust or engine bleed air. This fluid may be ducted spanwise from the engines through the wing leading edge, providing thermal deicing, and/or in the forward plenum section 40f of the underwing manifold 40.

The enhanced growth of the upper interface vortex array 37u is a critical feature of the present invention. First, this vortex array is endowed with increased strength by its generation within the wing chord length where the slower underwing gap flow provides a greater velocity differential. The reduced velocity of the gap flow 42 is the driver for this mechanism, and it is available only within the wing chord length. Aft of the wing the jet is bounded by the free stream on both its interfaces, and hence the vortex strength is the same on both sides, i.e., the increase in circulation reaction strength on its upper side will vanish. Second, its enhanced mixing with the gap flow transforms a greater portion of the residual linear jet energy into rotational form. These two provisions thereby make more effective use of the available residual jet energy and generate more of the required negative circulation reaction than would otherwise occur.

The benefits of this enhanced vortex structure appear in several ways. First, it provides an improved boundary condition for the underwing flow. The enlarged upper vortex array 37u serves as a more effective pneumatic shield in reflecting a greater portion of the compression waves 43 generated by the forward concave-down wing underside 39f back upwards to increase the pressure on the wing backside 39b, providing a thrust component due to its upward reflex. From another point of view, the gap flow 42 is restricted by the vortex growth to a channel of lesser cross section, generating a higher pressure which is sustained to the wing trailing edge 31. Second, the enhanced mixing spreads the residual jet energy over a greater mass of air, providing a form of jet augmentation to increase the propulsive efficiency of the underwing jet, with the upwards reflexed wing backside 39b acting as the jet augmentation shroud. Third, the underwing jet/vortex array extends far aft of the wing providing a longer effective wing chord to improve lift efficiency.

The vortex growth increases the wave reflection 44 by providing a diverging upper boundary 37b having improved reflection over the classical boundary. Wave reflection from a free surface or vortex sheet is normally represented by the classical boundary conditions which approximate the boundary as having infinitesimal thickness, with the pressures 50c and flow directions 51c the same on both sides of the sheet, as shown in the upper portion of FIG. 6. However, with enhanced mixing the vortices or eddies grow rapidly in the flow direction to finite size which can sustain a transverse pressure gradient 50rf by vortex deformation and produce flows on its two sides that diverge 51rf in direction, as shown in the lower portion of FIG. 6. These real fluid boundary conditions increase the reflection and hence recovery of the wing compression energy, compatible with the increased negative circulation reaction of the larger size vortices.

The underwing jet is shown in FIG. 7 for these two boundary conditions including example wave patterns illustrating the greater net reflection from the asymmetric jet:

Case 1-Classical Boundary Conditions-Symmetric Jet
Case 2-Real Fluid Boundary Conditions-Asymmetric Jet For Case 1 an example is presented for a reasonable jet velocity of about twice the flight velocity. A compression wave 43 generated by the forward wing undersurface 39f encounters the upper surface 37u of the underwing jet 36. One third of the wave is reflected upwards from this classical symmetric jet 36c as a compression wave 44cr; two thirds is transmitted downwards into the jet as a compression wave 44ct at a lesser inclination due to its higher Mach number. On encountering the lower surface 37l of the underwing jet 36, which is a weaker interface due to the lesser difference in velocities across its surface, only one fifth of the wave is reflected and this time as an expansion wave 44cre (shown dashed). This wave continues upwards, encountering again the stronger upper interface 37u, where as before one third is reflected and two thirds transmitted. The final upwards transmitted wave is an expansion having a strength which is the product of its precursors, or about one tenth, which detracts from the one-third initial compression reflection.

For Case 2 the same mechanism holds. But the real fluid boundary conditions of the asymmetric jet, for the same example where the jet has a velocity twice the flight velocity, provide an initial reflection of two thirds and a subsequent upwards transmitted expansion of one forty fifth, almost negligible. So the real fluid asymmetric jet 36rf gains in two ways, first by a greater initial reflection and second by a lesser subsequent expansion.

The mechanism of flow divergence due to mixing layer growth and inclination of the real fluid boundary is shown in FIG. 8. An incident Mach wave 54 at angle $\mu$ and an incident weak compression wave 56 at angle $\beta$ are shown. The flow U turns through an angle $\theta_1$ on passing through the weak compression wave. The angles of the outgoing reflected waves are shown to depend on the inclination of the reflecting surface. For a surface inclined at the same angle $\theta_1$ as the flow U the wave will not reflect at all and instead be "absorbed", or sometimes is said to reflect as a Mach wave $\beta_1$. If the surface is not inclined, shown as $\theta_2$, the weak compression wave will reflect at an angle $\beta_2$ similar to the angle of incidence $\beta$. A surface inclined upwards, say at an angle $\theta_3$ as shown, provided by a real fluid diverging asymmetric jet, will reflect at an increased angle $\beta_3$ and turn or deflect the flow U upwards at a corresponding angle $\theta_3$, with a proportional increase in pressure. This pressure increase will also deflect the underwing vortex flap downwards to a greater extent, thereby increasing the downward momentum imparted to the flow below.

This increase in pressure due to vortex spreading is shown in the chart of FIG. 9, which is a plot of the reflection coefficient R versus the dynamic pressure ratio $\lambda$ of the two streams. In this plot, which considers only the flow spreading real fluid boundary condition 51rf, the parameter $\kappa$ is the ratio of the vortex spreading angle $\theta$ to the downward angle $\sigma$ of the forward wing undersurface 39f. The plot shows that for a unit value of this ratio $\kappa$, which corresponds to a vortex spreading angle equal to the undersurface slope, and for a dynamic pressure ratio $\lambda$ of 1.85, the reflection is increased by a factor of three over the value for the classical boundary.

Figure 10:
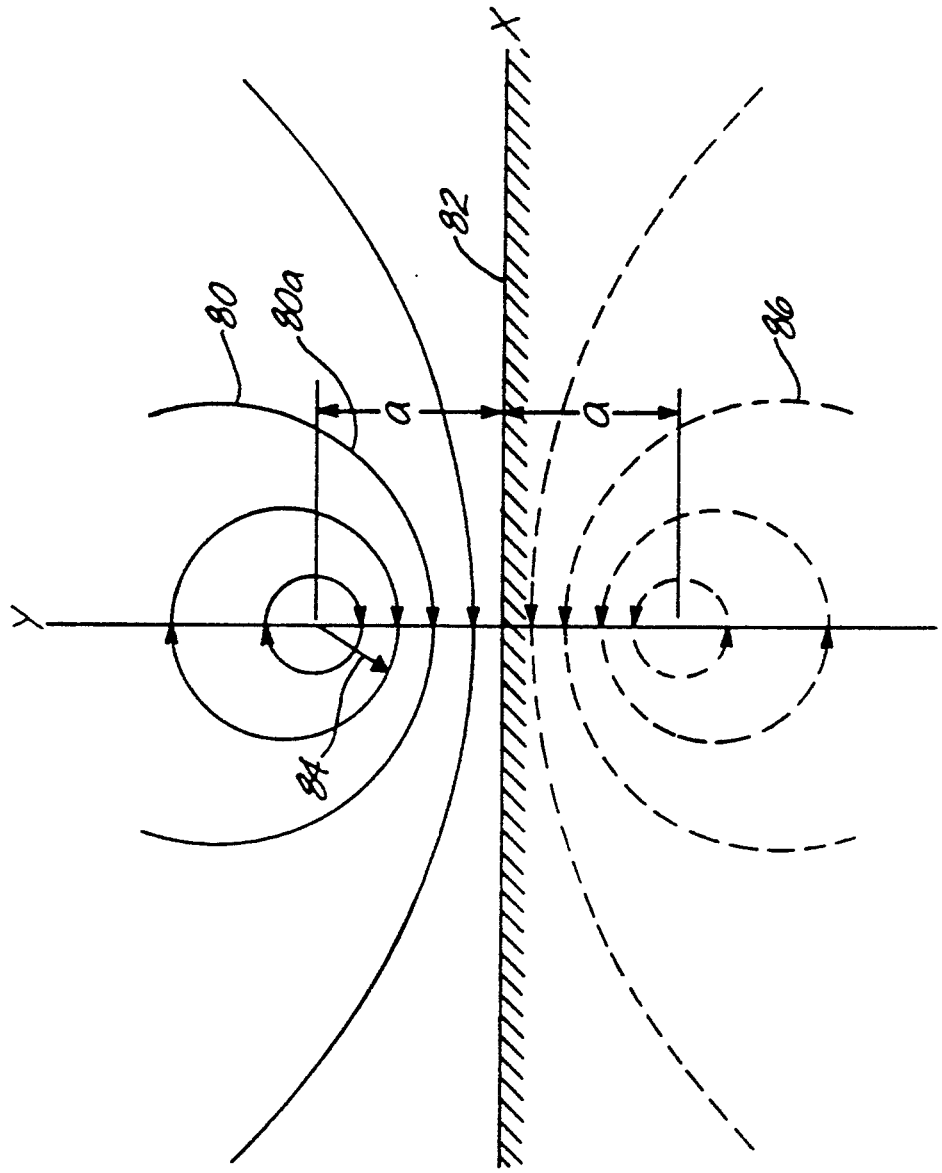
FIG. 10 is a chart showing the deformation and compression of a vortex adjacent to a solid wall, and illustrating how the wall may be represented by an image vortex.

The increase in reflection due the ability of a real fluid shear layer 36rf to sustain a pressure gradient depends on vortex deformation, as illustrated in FIG. 10. In this figure, taken from a standard textbook, a vortex 80 is shown in the proximity of a solid wall 82, where the vortex is deformed to a greater extent in its side 80a adjacent the wall. This greater deformation reduces the radii of curvature 84 of the rotating flow in the compressed region, increasing the centrifugal force, which is balanced there by a greater pressure gradient. FIG, 10 also illustrates that the solid wall 82 can be replaced by an image vortex 86 to facilitate calculation of the flow field.

Figure 11:
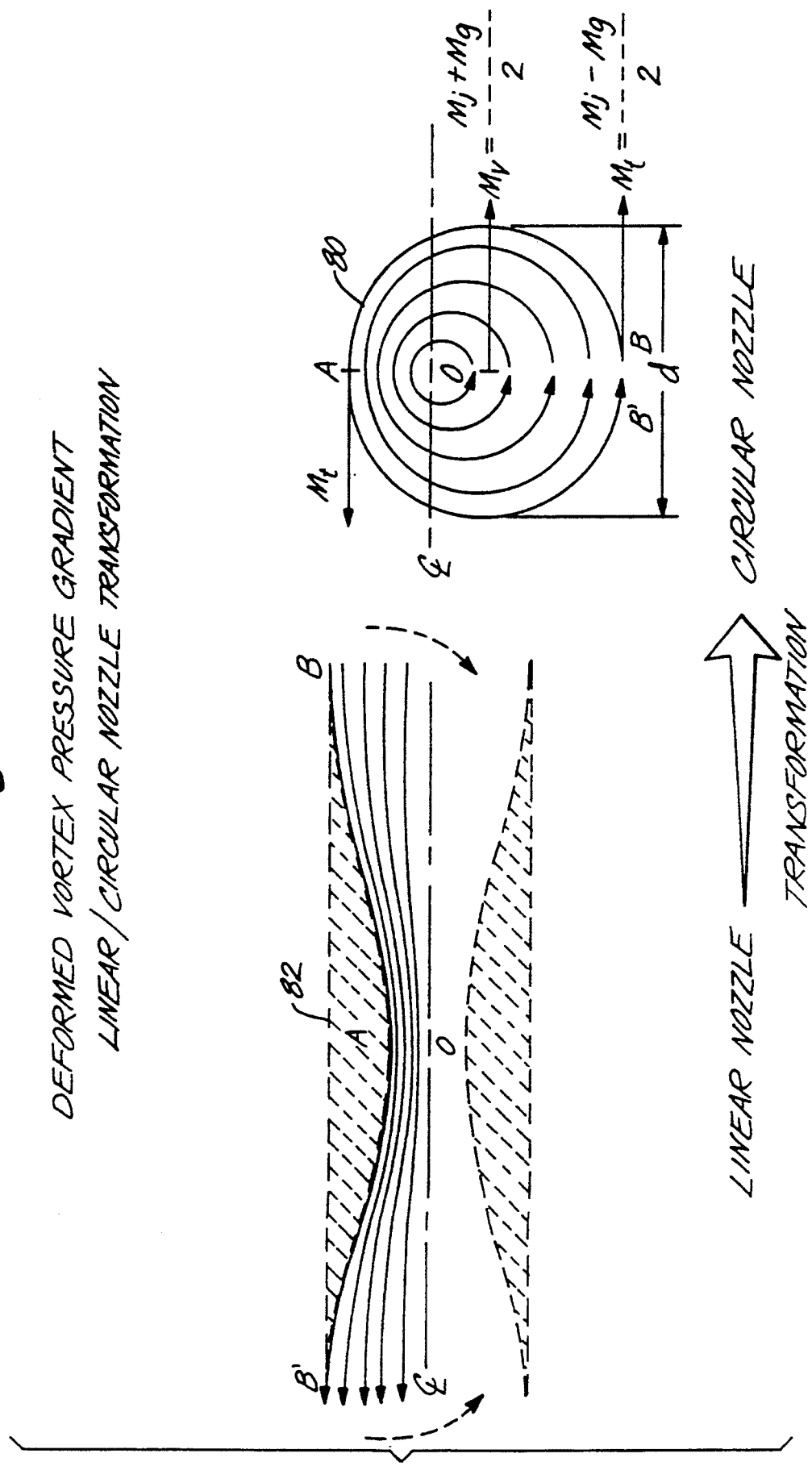
FIG. 11 is a schematic illustration of how a deformed circular nozzle may be represented as a transformation of a linear supersonic nozzle.

The pressure gradient mechanism in a deformed vortex 80 is further illustrated in FIG. 11, which displays its analogy with a conventional supersonic nozzle. In this figure a linear supersonic nozzle 82 is shown where the flow is compressed in its throat O-A, providing an increase in pressure with a corresponding decrease in velocity. If this nozzle 82 were wrapped around its center O into a circular nozzle 80 as indicated, the transformation would represent the deformed circular nozzle 80 described.

Figure 12:
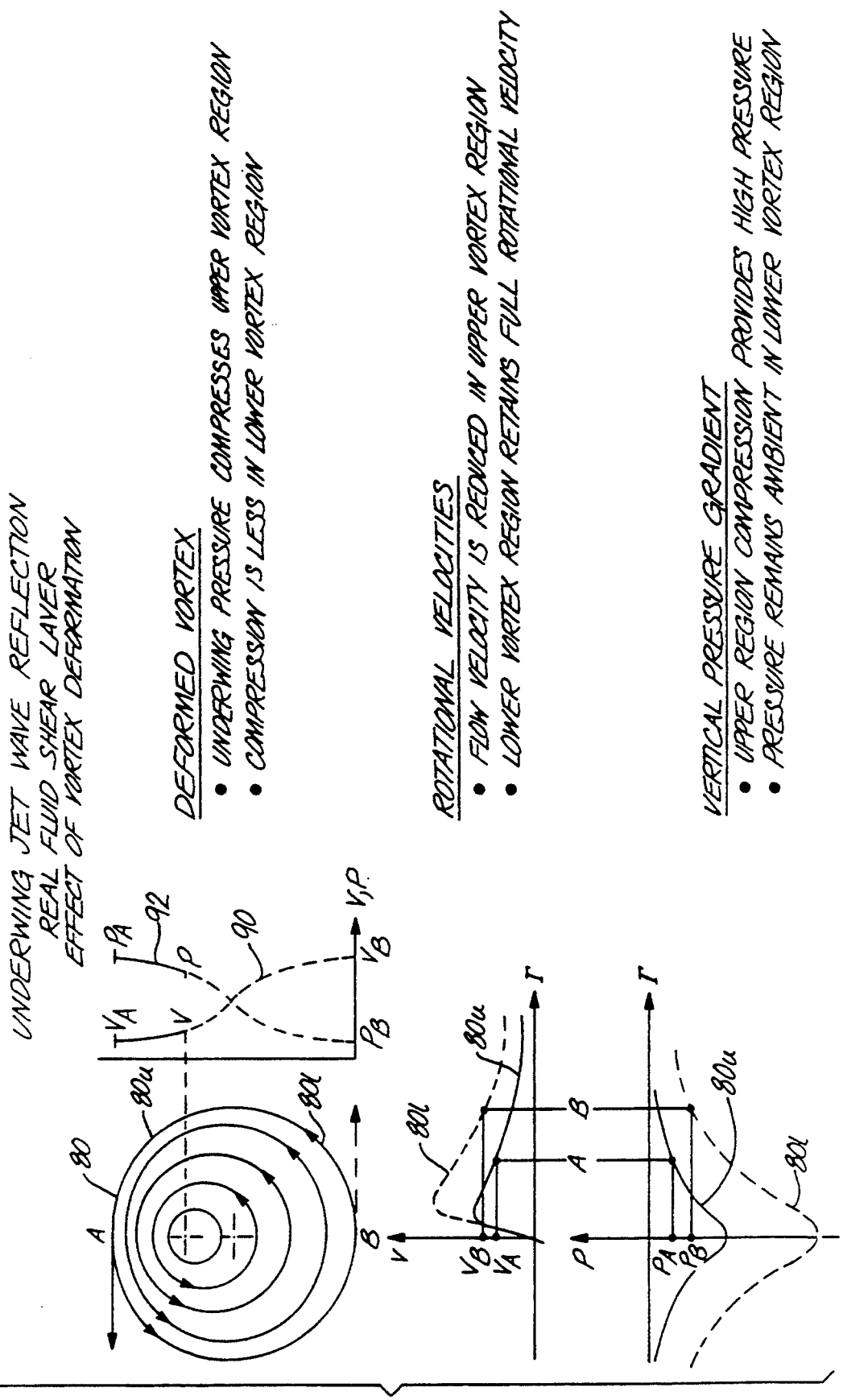
FIG. 12 is a summary chart illustrating the velocity and pressure distributions of the upper and lower regions of the deformed vortex.

Vortex deformation effects are illustrated in FIG. 12. The upper sketch shows the deformed vortex 80 together with a plot of its vertical variations in velocity 90 and pressure 92. The middle plot illustrates the velocity distributions of the upper 80u and lower 80e regions of the vortex 80. The lower plot shows the pressure distributions of the two regions 80u and 80l in a similar manner.

The two further reflection factors imposed by the real fluid boundary conditions, vortex spreading and vortex deformation, may be examined in a quantitative manner by deriving a mathematical representation, based on substitution of the flow potential into these new boundary conditions and solving for the resulting reflection.

Such a derivation results in a new General Reflection Coefficient R as shown in FIG. 13, presenting reflection from the real fluid shear layer as a function of the geometric and flow variables, expressing this reflection as the sum of three terms, namely:

Classical 102-the effect of an idealized infinitesimal thickness layer

Pressure Gradient 104-the effect of the deformed real fluid vortices

Spreading 106-diverging surface effect due to vortex growth

In addition to the classical term 102, two new terms, "pressure gradient 104" and "spreading 106" now appear, one for each real fluid boundary condition, pressure 50rf and flow direction 51rf. The factors in this equation are defined as follows:

| Symbol | Factor |
|---|---|
| $\lambda$ | dynamic pressure ratio |
| $\alpha$ | total spreading angle |
| $\sigma$ | underwing down-angle |
| $\delta$ | vertical vortex pressure gradient, |
| $\beta$ | $\frac{P_\infty - P_{gap}}{(M^2 - 1)^{\frac{1}{2}}}$ |
| $M_\infty$ | free stream Mach number |
| $M_{jet}$ | jet Mach number |
| $M_{gap}$ | gap Mach number |
| $\epsilon$ | vortex deformation, % |
| $P_{gap}$ | underwing gap pressure |
| $P_\infty$ | free stream pressure |
| $\rho$ | air density |

The spreading, or vortex growth term 106, depends only on the angles $\alpha$ and $\sigma$, and the dynamic pressure ratio $\lambda$. The underwing down angle $\sigma$ is negative, so the spreading pressure contribution is positive. Its increase in pressure is achieved primarily by deflection of the flow due to the upwards inclined boundary, as shown in FIG. 8 previously.

The pressure gradient term 104 depends primarily on the pressure difference $\delta$ between the underwing gap flow $M_{gap}$ and the external free stream $M_\infty$, which is the vertical pressure gradient $P_\infty - P_{gap}$ across the shear layer leading to vortex deformation, as illustrated previously in FIG. 12. This pressure gradient will be sustained by the internal vortex structure, which balances the centrifugal force within the deformed vortex by the pressure gradient. In a precise model the gradient will appear in the stream direction or inclined plane of the underwing vortex flap, with both vertical and horizontal components. The horizontal component will transport the pressure aft, providing a longer effective wing chord.

The plots in the lower portion of FIG. 13 illustrate the dependence of the reflection coefficient R on its three terms. The classical term 102 is presented in standard textbooks, and provides only a modest reflection. The pressure gradient 104 and spreading 106 terms are the contributions of the real fluid boundary conditions provided by the present invention. These contributions appear considerably larger than the classical term 102 for reasonable values of the parameters shown, illustrating the major gains in performance achieved by the new shock-free supersonic system of this invention.

The enhancement provisions of the present invention are based on imparting a pressure pulse into the flow at a frequency related to the natural frequency of the eddy formation on the jet interfaces. The excitation frequency may be the same as the natural frequency, or some harmonic thereof. The excitation provisions may be acoustic, electrical, mechanical, geometric, laser, or any other oscillation means such as to emit a pressure perturbation into the flow in a manner as to induce resonance in the interface eddies, providing an unstable internal structure to cause the eddies to merge, pair, and grow rapidly in the streamwise direction. FIG. 14 illustrates several possible electromechanical mechanisms for imparting this excitation pulse.

Figure 14A:
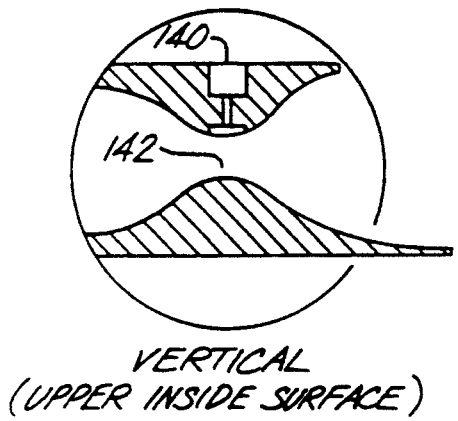
FIGS. 14a, b, c, d and e are schematic presentations of several electromechanical excitation mechanisms for the section of the underwing generator shown by lines 14—14 in FIG. 5 to induce resonance in the interface vortex array to enhance flow mixing and stimulate vortex growth.
Figure 14B:
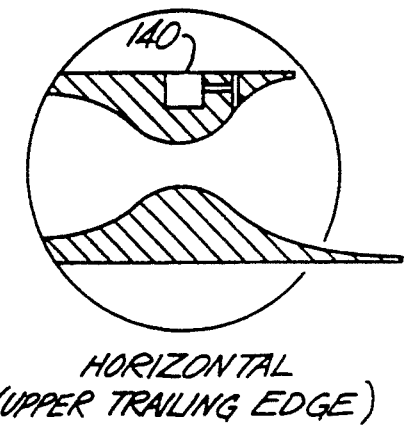
Figure 14C:
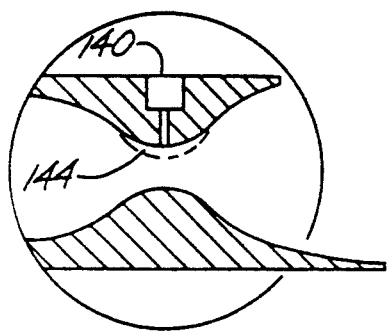
Figure 14D:
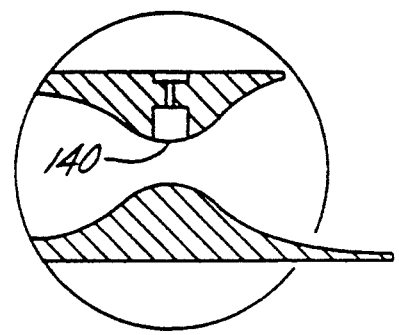
Figure 14E:
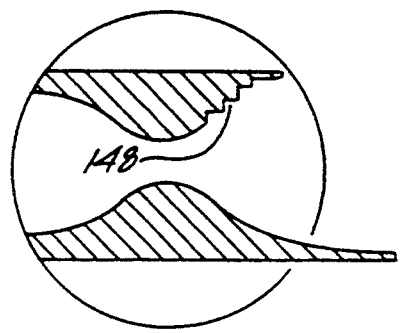

FIG. 14A illustrates a pulse mechanism 140 mounted in the top wall of the manifold throat 142 to emit a pressure pulse downwards from a plunger into the manifold internal flow; FIG. 14C has a similar plunger 140 internally mounted to pulse a flexible membrane 144. FIG. 14B shows a pulse mechanism 140 similarly located but oriented to emit the pulse aft. FIG. 14D illustrates an excitation mechanism 140 to emit a pulse into the gap flow 42 above the manifold. FIG. 14E illustrates a stepped upper inside surface 148 in the nozzle to impart vorticity by local separation selectively in the upper surface shear layer.

Acoustic excitation mechanisms could also be provided in the manifold in similar locations, primarily in the upper section of the planar nozzle 40 to selectively excite the jet stream 36 on its upper interface 37u.

A notch 146 in the upper wall of the manifold 40 would also serve as an excitation mechanisms and would have the advantage of being a passive structure, operating like a whistle. Variable width of the notch would be incorporated to control its frequency.

The excitation mechanisms could also be located on the forward underwing surface 39f, ahead of the compression field, so that its excitation pulses would interact with the upper jet interface in conjunction with the compression waves 43 to enhance the vortex growth.

FIG. 15 illustrates schematically the vortex pairing character provided by the excitation mechanism disclosed. In this sketch the vortices formed on the upper jet interface 37u between the underwing gap flow 42 and the jet flow 36 are numbered in sequence as they emerge from the nozzle 40. The excitation mechanism 41 then emits pressure pulses at the same rate, i.e., the same frequency or some harmonic thereof, to depress every other vortex, alternating between overpressure and underpressure, causing the vortex pair to rotate. As succeeding vortex pairs emerge, the continuing vortex rotation leads to their pairing and providing a streamwise growth structure. From another point of view the excitation provisions within the nozzle 40 will cause the jet 36 to emerge with an alternating underpressure and overpressure, which with proper harmonic sequencing, will generate the vortex rotation and pairing mechanism described.

The receiver 54 could be located downstream of the jet nozzle, say on the wing undersurface, as shown in FIG. 5, to detect the emerging frequency of the interface vortices, and transmit this data to control the frequency of the exciter 41.

The two circulation reaction systems—shock-generating and enhanced shock-free—are compared in FIG. 16. The shock-generating system of FIG. 16A has a negative wake 34n; the shock-free system of FIG. 16B has a positive wake 34p. The shock-generating system produces opposing circulation reactions, both positive and negative, operating at cross purposes, involving energy dissipations several times that required to produce a net negative circulation reaction to balance the positive wing circulation $+\Gamma_w$. This energy drain, since it is extracted from the flow at the price of wave drag, is particularly severe on performance.

The shock-free system, on the other hand, has a positive wake 34p, which nevertheless has a negative slope of its velocity profile, the integral of which is the required negative circulation reaction $-\Gamma_r$. Further, by employing a flat upper wing surface 39u, lift generation that would produce an adverse reaction is avoided. The system thereby employs minimum energy to generate only the negative circulation reaction $-\Gamma_l$ required in the lower wing gap flow, aside from a small positive reaction $+\Gamma_b$ due to the jet bottom interface. Furthermore, the negative circulation reaction provided by this positive wake is generated by residual energy from the propulsion system, with no adverse effect on performance.

The improved shock-free system of the present invention is directed towards employing enhancement provisions to force the transformation of residual linear jet energy into rotational form completely within the wing chord length. Such provision of the complete negative circulation reaction results in recovery of the underwing compression energy into increased pressure on the wing backside, as shown in the paragraphs above.

The jet/vortex array assembly will extend aft far beyond the wing as shown in FIG. 17, and will be deflected downwards by the underwing pressure while within the Mach wedge extending from the wing trailing edge. Thereafter this assembly will be gradually deflected back towards the horizontal by the free stream below, thereby providing a much longer effective wing chord to spread the downward momentum over an increased mass of air to improve the lift efficiency.

In the forward region exposed to the underwing lift pressure, downward deflection of the vortex assembly possibly would generate compression waves 150 having a forward perturbation velocity (compression) 152 as long as the assembly is within the wing Mach wedge, as shown in FIG. 17. These compression waves would normally coalesce into a strong shock wave extending to the ground and cause a sonic boom. However, with the positive wing circulation completely balanced by the negative jet vortex circulation reaction, further negative circulation such as would be produced by shock waves cannot arise in the flow. Hence generation of further shock waves in the flow below this assembly is not possible.

The answer to this paradox is illustrated in this figure, showing that the induced aft velocity (expansion) 154 of the dominant upper interface vortices 37u cancels the forward perturbation velocity 152 associated with the compression waves 150, generating a rotation-free downward momentum to provide lift but not allowing the compression waves to coalesce into a shock wave. Hence there is no shock wave extending to the ground to cause a sonic boom. Instead the weight of the aircraft appears on the ground as a long, smooth, low pressure footprint 156 extending far aft of the wing.

FIG. 18 illustrates another point of view regarding the jet/vortex flap assembly mechanism in the region aft and below the wing. As shown in this figure, the vortex flap assembly 37u is discharged aft from the wing with a velocity increment to provide thrust, but which after substantial mixing as shown has only a modest residual velocity. Thus after discharge the flap has essentially no horizontal motion, i.e., it is simply laid down as the wing passes. If it were attached to the wing, it would have a high velocity relative to the outside stream. But it is not attached to the wing, and has essentially zero velocity relative to the outside air into which it is discharged. Hence this flap will generate no waves.

In a sense the mechanism thus transforms a supersonic wing into a subsonic vortex array having an effective Mach number 160 of zero. The vortex flap 37u will be deflected downwards by the underwing pressure, and will in turn push down the outer fluid. So linear downward momentum is imparted to the air below, providing lift, but no waves are generated associated with rotational momentum.

Again this model spreads the downward momentum over a much longer effective wing chord 162, which in turn spreads the pressure corresponding to the weight of the aircraft smoothly over a much longer footprint 156 on the ground with no sonic boom.

A summary of the wing energy recovery system thus illustrates that the present invention provides three mechanisms in a synergistic manner that increase the pressure on the upwards reflexed wing backside to produce thrust and useful work to benefit aircraft efficiency:

Underwing Compression Wave Reflection
  recovers wave compression into useful work this recovered energy appears as pressure on wing backside Jet Augmentation
  spreads jet linear momentum over increased mass of air this mixing transforms linear momentum into rotational form reduced mixed stream velocity augments pressure on wing backside Jet Flap
  increased underwing gap pressure
    inclines shear layer downward
    compresses and deforms shear layer vortices
  deformed vortex internal structure sustains pressure gradient
  this gradient has vertical and horizontal components
    spreads lift momentum over longer effective wing chord
    results in increased pressure on wing backside Wave drag of the fuselage may also be alleviated by application of the reflection principles of the present invention. FIG. 19 illustrates a corporate jet aircraft having a cowl or jet manifold 170 mounted above the forward fuselage, which reflects the upwards oriented fuselage bow wave back downward to provide an increased pressure and thrust on the aft side of the bump region 172 on the upper fuselage surface, thereby recovering into useful work the otherwise wasted bow wave energy.

The upswept aft underside of an aircraft fuselage is usually a region of low pressure and hence high drag. The present invention locates a further jet manifold 174 forward of this surface to emit a jet aft, employing excitation provisions as disclosed herein, to enhance vortex growth on the upper interface of this jet to provide a high pressure and hence a thrust on the lower fuselage backside 176.

The cowl of FIG. 19 may be extended completely around the fuselage, and may include a manifold ring 180 to emit a jet flap 182 as illustrated in FIG. 20. This figure displays a circular fuselage 184 with a shoulder 186 completely around its perimeter to recover the axisymmetric conical bow shock 188 into forward thrust T and useful work. An extendable, forward, shock wave control spike 192 is also shown to locate the shock 188 on the manifold ring 180 properly for reflection recovery at off-design conditions.

Figure 21:
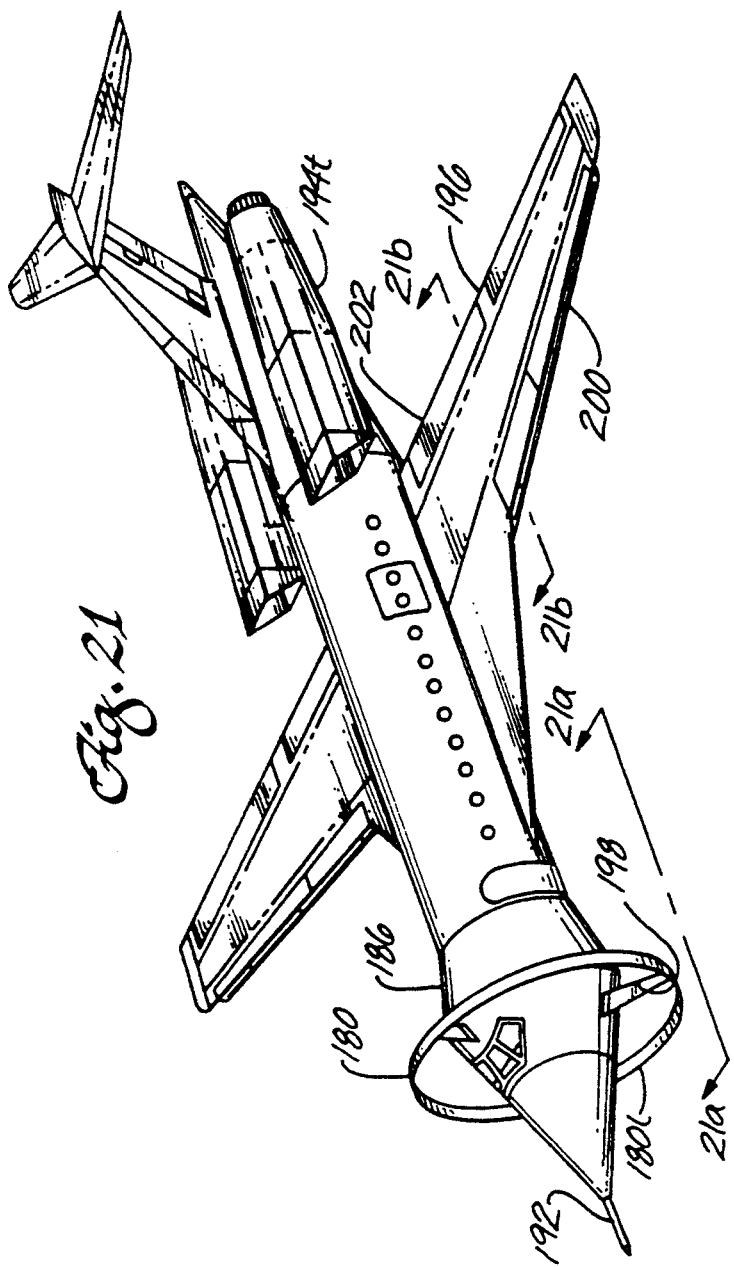
FIG. 21 is a perspective view of a corporate jet size aircraft illustrating both the forward-fuselage ring, bow energy recovery system as well as the large-span, modest-swept wing with its underwing jet for wing compression energy recovery in accordance with the invention.
Figure 21B:
FIGS. 21a and 21b are section views along lines 21A and 21B, respectively, in FIG. 21.
Figure 21A:
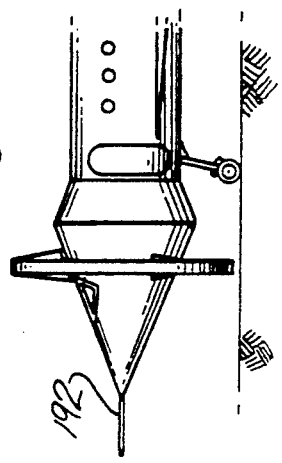
Figure 21C:
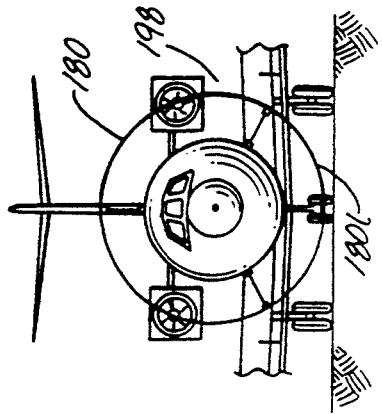
FIG. 21c is a front view of the embodiment of FIG. 21.

A corporate size aircraft with such a bow shock reflection ring 180, nose spike 192, and inward inclined energy recovery shoulder 186 is shown in FIG. 21, with tail mounted engines 194t. The figure also illustrates that recovery of the wing shock wave energy as outlined in this invention permits the use of a large-span modest-sweep wing 196, providing improved take-off and landing characteristics and less induced drag at both subsonic and supersonic speeds. The bow shock ring 180 is mounted on a plurality of struts 198 such that the lower portion of the ring 180l may be folded upwards for take-off and landing.

FIG. 22 illustrates the same principles of this invention applied to a transport size aircraft. The engines 163w in this case are mounted under the wing.

Operation of the conical bow shock wave control spike 192 is shown in FIG. 23, presenting a Mach number Table showing for a conventional wide-body transport fuselage the ring diameters required for compression energy recovery on the fuselage shoulder. This wave angle/ring diameter geometry is illustrated in FIG. 23(a). The extendable nose spike accordingly is arranged as shown in FIG. 23(b) to locate the conical bow wave on a 40.9 foot diameter ring over a flight range of Mach 2.4 down to Mach 1.8, thereby avoiding larger rings for lower Mach numbers where the entropy loss is small. The system then intercepts the conical bow shock wave and recovers its energy even at off-design Mach numbers.

The wing section 39, as shown in FIG. 5, has a flat upper surface 39u that generates no lift at supersonic speed when operating parallel to the free stream. However, the wing is provided with leading 200 and trailing 202 edge flaps as shown in FIGS. 21 and 22, which do produce lift on the upper surface when extended at low subsonic speeds, particularly for take-off and landing. The underwing jet 36 may also be employed to increase lift during take-off by blowing the extended trailing edge flaps 202. Further, this dispersion of the propulsive jet will decrease noise at take-off.

The spanwise underwing jet disclosed in this application may be continuous or intermittent. The aircraft illustrated in FIGS. 21 and 22 display a continuous spanwise manifold emitting a jet across essentially the entire span of the wing and continuing uninterrupted under the fuselage.

Figure 24:
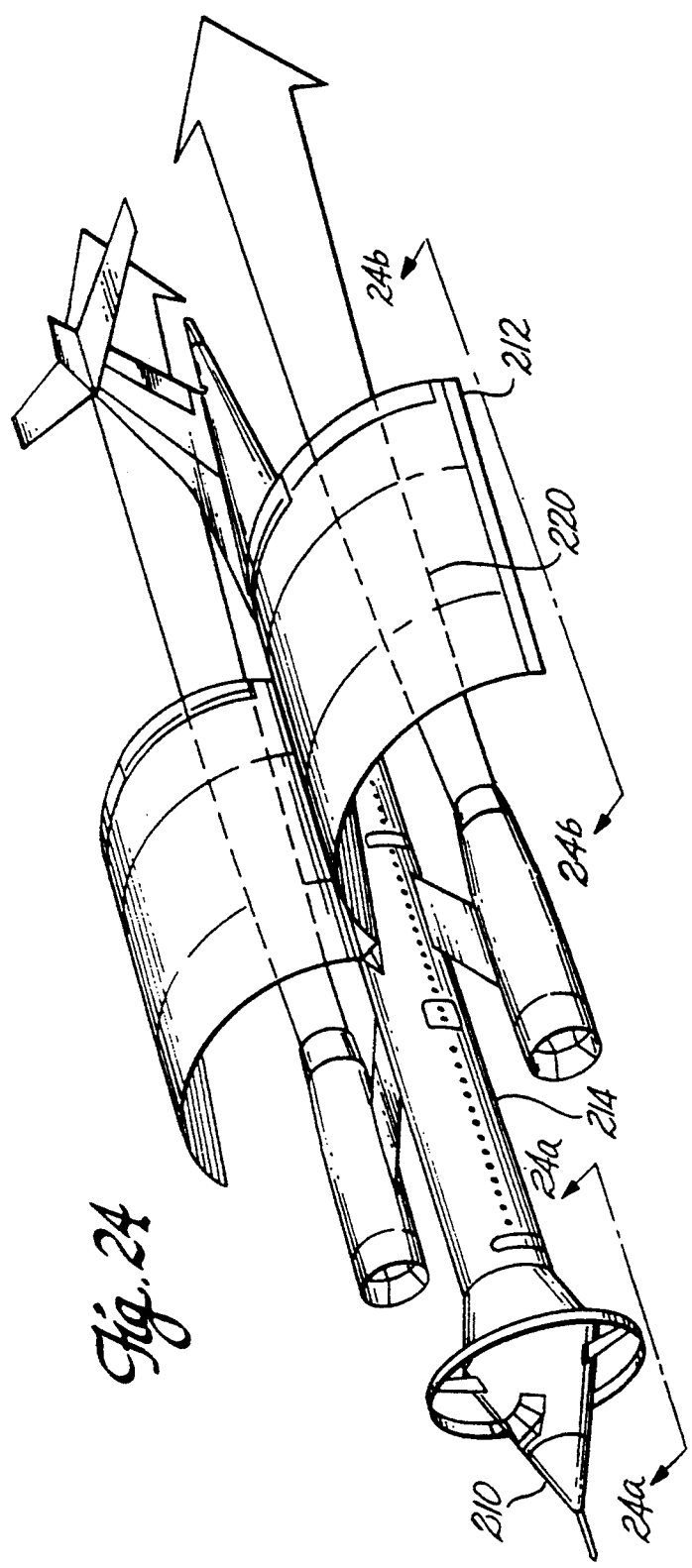
FIGS. 24, 24a, 24b and 24c are the perspective section and front views, respectively, of a transport size aircraft illustrating a parasol wing with engines located at the focus of its inward inclined compression waves so their exhaust can reflect these waves back to the upward reflexed backside of the wing for recovery into thrust.
Figure 24B:
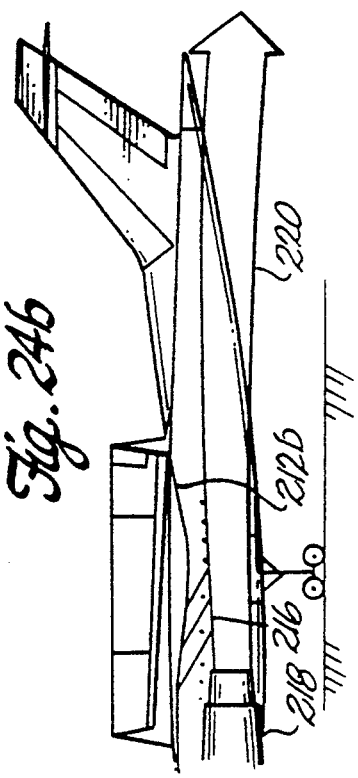
Figure 24A:
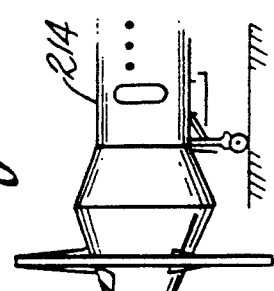
Figure 24C:
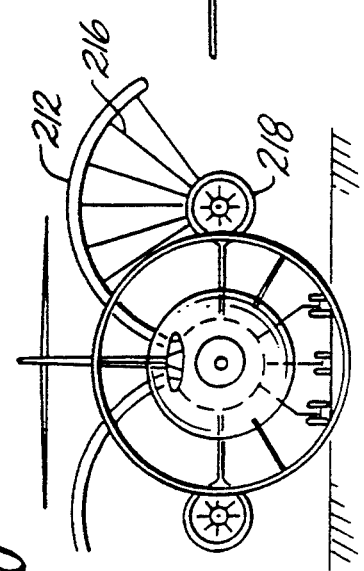

The underwing jet alternatively may be provided in an intermittent manner, say in the form of discrete segments, and in conjunction with a wing shaped to focus the compression waves on those discrete jet segments. FIG. 24 illustrates a transport size aircraft 210 having a wing 212 concave down spanwise on both sides of the fuselage 214 to incline the wing compression waves 216 generated by the forward wing undersurface 212f inwards onto the underwing engines 218 and their exhaust streams 220. The exhaust streams 220 then serve as these discrete jet segments to intercept and reflect the underwing compression waves 216 back to the upwards reflected wing backside 212b to recover their energy into useful work.

Use of the entire exhaust for this reflection role with its large energy may preclude the necessity of interface mixing as outlined in this application, but if required the same enhancement provisions may be applied to the upper surface of the exhaust jets as described herein.

Upward inclination of the jet with respect to the free stream adds to the efficacy of the present invention. As shown in FIG. 25a the jet manifold 40 emits the jet 36 at an average angle $\alpha$ with respect to the free stream. In the embodiment shown in the drawings, this angle may be as much as 15°. The inclination of the jet forces the higher velocity flow from the manifold into the slower gap flow resulting in mixing with and entrainment of the slower gap fluid. A net upward inclination of the jet upper interface increases reflection of the underwing compression waves by forcing them to turn through a greater angle thereby requiring a greater turning of the gap flow as previously described with respect to FIGS. 5 and 7. Greater turning of the gap flow will result in a corresponding increase in pressure on the reflex undersurface of the wing.

As demonstrated in FIG. 25b, pivotal mounting of the manifold allows controlled alteration of the angle of inclination $\alpha$. Varying of the inclination angle through rotation of the manifold at a resonant frequency provides an alternate means of enhancement for the vortex flow at the interface of the jet. Downward loading on the jet manifold due to the inclined jet is overcome through the enhanced reflection of the underwing compression waves and increased pressure on the wing undersurface, which involves significantly greater mass of air to produce increased thrust and lift more than off-setting the down-loading on the jet manifold.

Figure 26A:
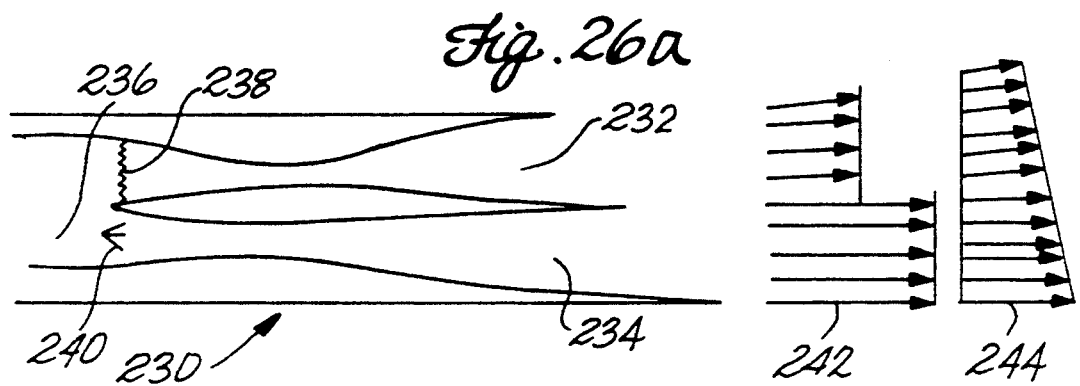
FIG. 26a discloses a double nozzle configuration with a common single stagnation stream to provide a negative pressure profile by modification of the stream in the nozzles.

Enhanced stability of the jet and increased performance in reflection of compression waves to the wing undersurface is accomplished by creating a velocity profile having a lower velocity at the upper interface of the jet and a higher velocity at the lower interface of the jet. This negative velocity profile locates the higher velocity portion of the jet at the lower interface where its greater inertia will minimize adverse deflection of the jet downward. The lower velocity upper surface of the jet with corresponding higher pressure will increase the beneficial expansion of the jet upward to increase the desired pressure on the wing undersurface. FIG. 26a demonstrates a first nozzle system employing a double nozzle to achieve the negative velocity profile. The nozzle system 230 comprises an upper nozzle 232 and a lower nozzle 234. A common stagnation pressure plenum chamber 236 provides high pressure fluid to be expelled through the nozzles. A retardation screen 238 is positioned across the entrance to the upper nozzle to reduce the stagnation pressure of the gas stream provided from the plenum chamber. The upper jet is then emitted with a lower energy level and consequent lower velocity than the jet from the lower nozzle. The velocity differential is alternatively created through the use of a fuel burning system 240 at the entrance to the lower nozzle. The fuel burning system adds energy to the steam entering the lower nozzle providing higher velocity flow in the lower nozzle to obtain the negative velocity profile. Combination of the retardation screen and fuel burning in the respective nozzles further enhances the desired negative velocity profile. The jet emitted by the two nozzles is demonstrated schematically by velocity profile 242 immediately aft of the nozzles. This discontinuous flow homogenizes to the desired velocity profile 244 downstream of the nozzles. Further enhancement of the negative velocity profile is accomplished through truncation of the upper nozzle to emit the jet in an under expanded condition. The lower nozzle is not truncated, fully expanding the flow at the jet lower surface for maximum velocity.

Figure 26B:
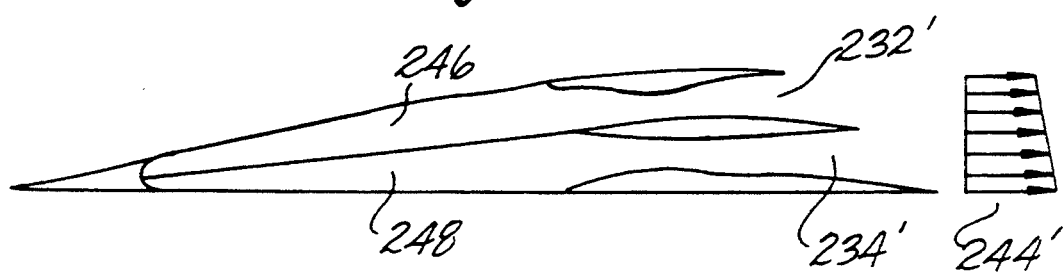
FIG. 26b is a second embodiment of the double nozzle arrangement providing two separate jets originating from two separate stagnation pressure plenum chambers.

FIG. 26b provides an alternate embodiment employing an upper and lower nozzle to obtain the desired negative velocity profile. Upper nozzle 232' is fed by a stagnation pressure plenum chamber 246 while lower nozzle 234' is fed by a second stagnation pressure plenum chamber 248. Two separate streams of energized air of differing stagnation pressures are drawn from the engine to feed plenum chambers 246 and 248. Employing higher energy air in the lower plenum chamber provides higher velocity for the fully expanded lower nozzle while use of lower energy air in the upper stagnation chamber provides lower velocity from the upper nozzle. A velocity profile 244' is achieved downstream of the nozzle.

Figure 26C:
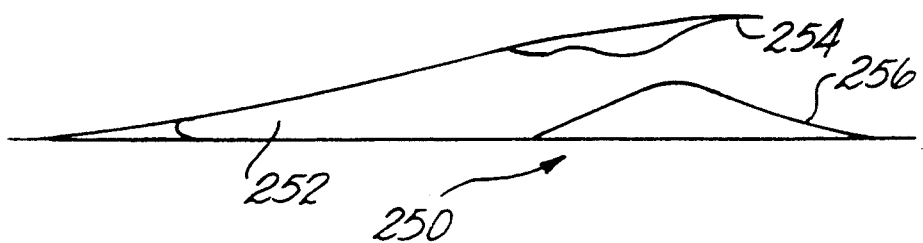
FIG. 26c discloses a single unsymmetrical nozzle arrangement for creating the desired negative velocity profile.

A single nozzle arrangement to provide the desired negative velocity profile is shown in FIG. 26c. The nozzle 250 incorporates a single plenum chamber 252 for high energy air from the engine. Truncation of the upper expansion surface 254 of the nozzle in comparison with the fully expanded lower surface of the nozzle 256 provides the desired negative velocity profile. Nozzle tailoring employing an asymmetric throat or other fluid flow management techniques are alternatively employed in a single nozzle concept to provide the negative velocity profile.

Having thus described my invention, what I claim as novel and desire to secure by Letters of Patent of the United States is:

1. In an aircraft, a compression wave energy control system comprising:
a wing, said wing having an upper and a lower surface, said upper surface being flat and aligned with the free stream at cruise conditions to generate zero lift and hence no adverse circulation reaction at supersonic speed, said lower surface being gently curved concave downward in both its forward and aft sections, connected by a center convex section to comprise the upper section of a supersonic nozzle, and a nozzle located. below and apart from said wing, said nozzle emitting a jet.

2. The improvement claimed in claim 1 wherein said wing has extendable leading and trailing edge flaps to generate lift on said upper surface for low speed subsonic operation such as take-off and landing.

3. In an aircraft having a wing, a fuselage, and a plurality of engines mounted under said wing, a compression wave energy control system comprising:
an upper and a lower surface on said wing, and a concave down spanwise shape of said wing on either side of said fuselage such that the compression waves from said wing undersurface focus inwards onto the exhaust from said engines to reflect said compression waves back to the upwards reflexed backside of said wing and wherein the upper surface of said wing is falt in the free stream direction at cruise conditions.

4. A wing for an aircraft having for essentially its entire chord length a flat upper surface parallel to the free stream at cruise conditions to generate no disturbance of air flow above the wing in supersonic flight, an undersurface downwardly sloping from the wing forward edge to deflect the air stream downwards generating left, and an upwardly sloping aft undersurface against which compression waves may be reflected for energy recovery, and means below the wing for reflecting compression waves generated at supersonic speed by the undersurface of the forward portion of the wing upwards towards the under-surface of the aft portion of the wing generating additional lift.

5. A wing for an aircraft having for essentially its entire chord length a flat upper surface parallel to the free stream at cruise conditions to generate no disturbance of air flow above the wing in supersonic flight, an undersurface downwardly sloping from the wing forward edge to deflect the air stream downwards, and an upwardly sloping aft undersurface against which compression waves may be reflected from energy recovery, and means comprising a nozzle attached to and carried under the wind directed to emit a substantially planar jet below the wing for reflecting compression waves generated at supersonic speed by the downward sloping undersurface of the forward portion of the wing upwards towards the upwardly sloping undersurface of the aft portion of the wing.

6. A method of flying a wing for an aircraft at supersonic velocities comprising passing the stream of air immediately above the wing with essentially no disturbance and deriving no lift therefrom, deflecting the stream of air immediately below the wing downwardly from the front portion of the wing to generate lift and compression waves, reflecting the compression waves from the forward undersurface portion of the wing upwards towards the aft portion of the wing for energy recovery in the form of lift and forward force.

7. A method of flying a wing for an aircraft at supersonic velocities comprising passing the stream of air immediately above the wing with essentially no disturbance and deriving no lift therefrom, deflecting the stream of air immediately below the wing downwardly from the front of the wing to generate lift and compression waves, and forming an essentially planar gas jet under the wing to intercept and reflect the compression waves to cause an increased positive pressure on the aft underside portion of the wing to recover the compression energy into useful work in the form of lift and forward force.

8. A compression wave energy control system for an aircraft comprising:

a wing having an upper and lower surface, said lower surface including a portion downwardly sloping from the wing forward edge to deflect the airstream downwards and an aft portion upwardly sloping to the trailing edge against which compression waves may be reflected for energy recover; and a nozzle emitting a jet, said nozzle located below and apart from said wing whereby compression waves from the forward portion of the wing lower surface are intercepted by the jet and reflected upwards to the aft portion of said wing, said jet emitted from said nozzle at an angle inclined upward with respect to the free stream wherein the upper surface of the wing is flat and aligned with the free stream at cruise conditions to generate no disturbance of air flow above the wing in supersonic flight.

* * * * *